(12) United States Patent (10) Patent No.: US 9,135,070 B2
Inoue (45) Date of Patent: Sep. 15, 2015

(54) PREVENTING MEMORY EXHAUSTION OF INFORMATION PROCESSING APPARATUS BASED ON THE PREDICTED PEAK MEMORY USAGE AND TOTAL MEMORY LEAKAGE AMOUNT USING HISTORICAL DATA

(75) Inventor: Taku Inoue, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 1026 days.

(21) Appl. No.: 12/534,926

(22) Filed: Aug. 4, 2009

(65) Prior Publication Data

US 2010/0070974 A1 Mar. 18, 2010

(30) Foreign Application Priority Data

Sep. 17, 2008 (JP) ................. 2008-238385

(51) Int. Cl.
*G06F 9/46* (2006.01)
*G06F 9/50* (2006.01)
*G06F 11/30* (2006.01)
*G06F 12/02* (2006.01)

(52) U.S. Cl.
CPC .......... *G06F 9/5016* (2013.01); *G06F 11/3037* (2013.01); *G06F 11/3065* (2013.01); *G06F 12/0253* (2013.01); *G06F 2209/504* (2013.01); *Y02B 60/142* (2013.01)

(58) Field of Classification Search
CPC ............ G06F 11/3065; G06F 11/3037; G06F 12/0253; G06F 2209/504; Y02B 60/142
USPC ......... 718/101, 104; 711/170; 714/47.1, 47.2, 714/47.3, 42, 48
See application file for complete search history.

(56) References Cited

U.S. PATENT DOCUMENTS

| 7,162,605 B2 * | 1/2007 | Achanta et al. ............... 711/170 |
| 7,487,321 B2 * | 2/2009 | Muthiah et al. ............... 711/170 |
| 7,779,223 B2 * | 8/2010 | Dickenson .................... 711/170 |

(Continued)

FOREIGN PATENT DOCUMENTS

| EP | 456275 A2 * | 11/1991 |
| JP | 8-220199 | 8/1996 |

(Continued)

OTHER PUBLICATIONS

Chilimbi et al., Low-Overhead Memory Leak Detection Using Adaptive Statistical Profiling, Oct. 9-13, 2004, ACM, 156-164.*

*Primary Examiner* — Mengyao Zhe
*Assistant Examiner* — Abu Ghaffari
(74) *Attorney, Agent, or Firm* — Fitzpatrick, Cella, Harper & Scinto

(57) ABSTRACT

A support apparatus that supports an information processing apparatus is provided. The support apparatus comprising: a storage unit configured to associate and store settings of an executed job, a leakage amount of a memory leak, and a peak amount of memory; an acquisition unit configured to acquire a job group and settings for executing each job; a prediction unit configured to compare the settings stored in the storage unit and the settings acquired by the acquisition unit, and predict a leakage amount and a peak amount when the job is executed by the information processing apparatus; and a determination unit configured to determine whether there is a job in the job group in which a total value of the predicted peak amount of the job and the predicted leakage amount of a job executed preceding the job exceeds a memory capacity of the information processing apparatus.

9 Claims, 25 Drawing Sheets

(56) References Cited

U.S. PATENT DOCUMENTS

| | | | |
|---|---|---|---|
| 7,793,161 B2* | 9/2010 | Chen et al. | 714/47.2 |
| 8,037,477 B2* | 10/2011 | Findeisen et al. | 718/104 |
| 8,132,190 B2* | 3/2012 | Vertes | 719/328 |
| 8,713,179 B2* | 4/2014 | Dawson et al. | 718/104 |
| 2004/0095459 A1 | 5/2004 | Russell et al. | 347/240 |
| 2005/0076184 A1* | 4/2005 | Schumacher | 711/170 |
| 2005/0204342 A1* | 9/2005 | Broussard | 717/124 |
| 2005/0268268 A1* | 12/2005 | Wang et al. | 716/9 |
| 2005/0273756 A1* | 12/2005 | Zhou | 717/100 |
| 2006/0085156 A1* | 4/2006 | Kolawa et al. | 702/119 |
| 2006/0271929 A1* | 11/2006 | Brack et al. | 718/1 |
| 2007/0136402 A1* | 6/2007 | Grose et al. | 707/206 |
| 2008/0046673 A1* | 2/2008 | Hwang | 711/170 |
| 2009/0037687 A1* | 2/2009 | Li et al. | 711/173 |
| 2009/0138884 A1* | 5/2009 | Kakeda et al. | 718/104 |
| 2013/0145220 A1* | 6/2013 | Lv | 714/47.1 |

FOREIGN PATENT DOCUMENTS

| | | |
|---|---|---|
| JP | 2004-168062 | 6/2004 |
| JP | 2005-250302 | 9/2005 |
| JP | 2005-258585 | 9/2005 |

\* cited by examiner

F I G. 3A

| JOB ID | JOB TYPE | PARAM-ETER A | PARAM-ETER B | ... | PARAM-ETER X | PARAM-ETER Y | JOB CREATOR | JOB CREATION TIME AND DATE |
|---|---|---|---|---|---|---|---|---|
| 00010 | FIRST EXPOSURE SEQUENCE | - | - | ... | X1 | Y1 | Y.Sato | 20070901T101000 |
| 00020 | SECOND EXPOSURE SEQUENCE | - | - | ... | X2 | Y2 | J.Takeda | 20070901T110000 |
| 00030 | CALIBRATION | A1 | B0 | ... | - | - | - | 20070901T111000 |
| 00040 | CALIBRATION | A1 | B1 | ... | - | - | - | 20070901T111000 |
| 00050 | XX COMMAND | ... | ... | ... | ... | ... | ... | ... |
| ... | ... | ... | ... | ... | ... | ... | ... | ... |

FIG. 3B

| JOB ID | JOB TYPE | FUNCTION EXECUTION HISTORY | | | | | | | | | | |
|---|---|---|---|---|---|---|---|---|---|---|---|---|
| 00010 | FIRST EXPOSURE SEQUENCE | TRANS-FER | MEA-SURE-MENT 1 | EXPO-SURE | ... | EXPO-SURE | TRANS-FER | MEA-SURE-MENT 1 | EXPO-SURE | ... | ... | ... |
| 00020 | SECOND EXPOSURE SEQUENCE | TRANS-FER | MEA-SURE-MENT 1 | MEA-SURE-MENT 2 | EXPO-SURE | MEA-SURE-MENT 2 | ... | EXPO-SURE | TRANS-FER | MEA-SURE-MENT 1 | MEA-SURE-MENT 2 | EXPO-SURE |
| 00030 | CALI-BRATION | MEA-SURE-MENT 3 | ... | | | | | | | | ... | ... |
| 00040 | CALI-BRATION | MEA-SURE-MENT 3 | ... | | | | | | | | ... | ... |
| 00050 | XX COMMAND | ... | | | | | | | | | ... | ... |
| ... | ... | | | | | | | | | | ... | ... |

FIG. 4A-1 400

| JOB ID 401 | JOB TYPE 402 | FUNCTION NAME 403 | EXECUTION ORDER 404 | LEAK OCCURRENCE 405 |
|---|---|---|---|---|
| 00010 | FIRST EXPOSURE SEQUENCE | TRANSFER | 1 | NO |
| 00010 | FIRST EXPOSURE SEQUENCE | MEASUREMENT 1 | 2 | NO |
| 00010 | FIRST EXPOSURE SEQUENCE | EXPOSURE | 3 | YES |
| 00010 | FIRST EXPOSURE SEQUENCE | ... | 4 | ... |
| 00010 | FIRST EXPOSURE SEQUENCE | TRANSFER | 5 | NO |
| 00010 | FIRST EXPOSURE SEQUENCE | MEASUREMENT 1 | 6 | NO |
| 00010 | FIRST EXPOSURE SEQUENCE | EXPOSURE | 7 | YES |
| 00010 | FIRST EXPOSURE SEQUENCE | ... | 8 | ... |
| 00010 | FIRST EXPOSURE SEQUENCE | TRANSFER | 9 | NO |
| 00010 | FIRST EXPOSURE SEQUENCE | MEASUREMENT 1 | 10 | NO |
| 00010 | FIRST EXPOSURE SEQUENCE | EXPOSURE | 11 | YES |
| 00020 | SECOND EXPOSURE SEQUENCE | TRANSFER | 1 | NO |
| 00020 | SECOND EXPOSURE SEQUENCE | MEASUREMENT 1 | 2 | YES |
| 00020 | SECOND EXPOSURE SEQUENCE | MEASUREMENT 2 | 3 | NO |
| 00020 | SECOND EXPOSURE SEQUENCE | EXPOSURE | 4 | NO |
| 00020 | SECOND EXPOSURE SEQUENCE | ... | 5 | ... |
| 00020 | SECOND EXPOSURE SEQUENCE | TRANSFER | 6 | NO |
| 00020 | SECOND EXPOSURE SEQUENCE | MEASUREMENT 1 | 7 | YES |
| 00020 | SECOND EXPOSURE SEQUENCE | MEASUREMENT 2 | 8 | NO |
| 00020 | SECOND EXPOSURE SEQUENCE | EXPOSURE | 9 | NO |
| 00020 | SECOND EXPOSURE SEQUENCE | ... | 10 | ... |
| 00020 | SECOND EXPOSURE SEQUENCE | TRANSFER | 11 | NO |
| 00020 | SECOND EXPOSURE SEQUENCE | MEASUREMENT 1 | 12 | YES |
| 00020 | SECOND EXPOSURE SEQUENCE | MEASUREMENT 2 | 13 | NO |
| 00020 | SECOND EXPOSURE SEQUENCE | EXPOSURE | 14 | NO |
| 00030 | CALIBRATION | MEASUREMENT 3 | 1 | NO |
| 00040 | CALIBRATION | MEASUREMENT 3 | 1 | YES |
| ... | ... | ... | ... | ... |

F I G. 4A-2

| PARAMETER A | PARAMETER B | ... | PARAMETER X | PARAMETER Y | JOB CREATOR | JOB CREATION TIME AND DATE |
|---|---|---|---|---|---|---|
| - | - | ... | X1 | Y1 | Y.Sato | 20070901T101000 |
| - | - | ... | X1 | Y1 | Y.Sato | 20070901T101000 |
| - | - | ... | X1 | Y1 | Y.Sato | 20070901T101000 |
| - | - | ... | X1 | Y1 | Y.Sato | 20070901T101000 |
| - | - | ... | X1 | Y1 | Y.Sato | 20070901T101000 |
| - | - | ... | X1 | Y1 | Y.Sato | 20070901T101000 |
| - | - | ... | X1 | Y1 | Y.Sato | 20070901T101000 |
| - | - | ... | X1 | Y1 | Y.Sato | 20070901T101000 |
| - | - | ... | X1 | Y1 | Y.Sato | 20070901T101000 |
| - | - | ... | X2 | Y2 | J.Takeda | 20070901T110000 |
| - | - | ... | X2 | Y2 | J.Takeda | 20070901T110000 |
| - | - | ... | X2 | Y2 | J.Takeda | 20070901T110000 |
| - | - | ... | X2 | Y2 | J.Takeda | 20070901T110000 |
| - | - | ... | X2 | Y2 | J.Takeda | 20070901T110000 |
| - | - | ... | X2 | Y2 | J.Takeda | 20070901T110000 |
| - | - | ... | X2 | Y2 | J.Takeda | 20070901T110000 |
| - | - | ... | X2 | Y2 | J.Takeda | 20070901T110000 |
| A1 | B0 | ... | - | - | - | 20070901T111000 |
| A1 | B1 | ... | - | - | - | 20070901T111000 |
| ... | ... | ... | ... | ... | ... | ... |

FIG. 5

| | 501 | 502 | 503 | 504 | 505 |
|---|---|---|---|---|---|
| 207 | JOB TYPE | FUNCTION NAME | LEAK CONDITION | PEAK AMOUNT (BYTES) | LEAKAGE AMOUNT (BYTES) |
| | FIRST EXPOSURE SEQUENCE | EXPOSURE | (PARAMETER X=X1) AND (PARAMETER Y=Y1) | 31M | 105K |
| | SECOND EXPOSURE SEQUENCE | MEASUREMENT 1 | (PARAMETER X=X2) AND (PARAMETER Y=Y2) | 43M | 301K |
| | CALIBRATION | MEASUREMENT 3 | (PARAMETER A=A1) AND (PARAMETER B=B1) | 18M | 100K |
| | ... | ... | ... | ... | ... |

FIG. 7

| JOB ID | JOB TYPE | FUNCTION NAME | EXECUTION ORDER | LEAK OCCURRENCE | PARAMETER A | PARAMETER B | ... | PARAMETER X | PARAMETER Y | JOB CREATOR | JOB CREATION TIME AND DATE |
|---|---|---|---|---|---|---|---|---|---|---|---|
| 00030 | CALIBRATION | MEASUREMENT 3 | 1 | NO | A1 | B0 | ... | - | - | - | 20070901T111000 |
| 00040 | CALIBRATION | MEASUREMENT 3 | 1 | YES | A1 | B1 | ... | - | - | - | 20070901T111000 |
| 000xx | CALIBRATION | MEASUREMENT 3 | 1 | YES | A1 | B1 | ... | - | - | - | 20070901T111000 |
| ... | ... | ... | ... | ... | ... | ... | ... | ... | ... | ... | ... |

FIG. 9

```
LEAKAGE AMOUNT AND PEAK
AMOUNT CALCULATION PROCESS
            ↓
EXTRACT RECORDS THAT           — S901
SATISFY LEAK CONDITIONS
            ↓
CALCULATE PEAK AMOUNT AND LEAKAGE  — S902
AMOUNT OF EACH EXTRACTED RECORD
            ↓
CALCULATE AVERAGE VALUES OF PEAK   — S903
AMOUNT AND LEAKAGE AMOUNT
            ↓
           END
```

FIG. 10

| INPUT ORDER | JOB TYPE | RECIPE ID |
|---|---|---|
| 00010 | FIRST EXPOSURE SEQUENCE | R0010 |
| 00011 | SECOND EXPOSURE SEQUENCE | R0020 |
| 00012 | SECOND EXPOSURE SEQUENCE | R0030 |
| 00020 | FIRST EXPOSURE SEQUENCE | R0110 |
| 00021 | SECOND EXPOSURE SEQUENCE | R0120 |
| 00022 | SECOND EXPOSURE SEQUENCE | R0130 |
| ... | ... | ... |

FIG. 11A

| RECIPE ID | EXPOSURE ILLUMINATION MODE | RETICLE DATA | LAYOUT | ... |
|---|---|---|---|---|
| R0010 | IL0010 | RCL0010 | L0010 | ... |
| R0020 | IL0020 | RCL0020 | L0020 | ... |
| R0030 | IL0030 | RCL0030 | L0030 | ... |
| ... | ... | ... | ... | ... |
| R0110 | IL0110 | RCL0110 | L0110 | ... |
| R0120 | IL0120 | RCL0120 | L0120 | ... |
| R0130 | IL0130 | RCL0130 | L0130 | ... |
| ... | ... | ... | ... | ... |

FIG. 11B

| RETICLE DATA | PARAMETER X | PARAMETER Y | ... |
|---|---|---|---|
| RCL0010 | X1 | Y1 | ... |
| RCL0020 | X11 | Y11 | ... |
| RCL0030 | X111 | Y111 | ... |
| ... | ... | ... | ... |
| RCL0110 | X2 | Y2 | ... |
| RCL0120 | X22 | Y22 | ... |
| RCL0130 | X222 | Y222 | ... |
| ... | ... | ... | ... |

FIG. 12A

| INPUT ORDER (210/1201) | JOB TYPE (1202) | FUNCTION NAME (1203) | EXECUTION ORDER (1204) |
|---|---|---|---|
| 00010 | FIRST EXPOSURE SEQUENCE | TRANSFER | 1 |
| 00010 | FIRST EXPOSURE SEQUENCE | MEASUREMENT 1 | 2 |
| 00010 | FIRST EXPOSURE SEQUENCE | EXPOSURE | 3 |
| 00010 | FIRST EXPOSURE SEQUENCE | ... | 4 |
| 00010 | FIRST EXPOSURE SEQUENCE | TRANSFER | 5 |
| 00010 | FIRST EXPOSURE SEQUENCE | MEASUREMENT 1 | 6 |
| 00010 | FIRST EXPOSURE SEQUENCE | EXPOSURE | 7 |
| 00010 | FIRST EXPOSURE SEQUENCE | ... | 8 |
| 00010 | FIRST EXPOSURE SEQUENCE | TRANSFER | 9 |
| 00010 | FIRST EXPOSURE SEQUENCE | MEASUREMENT 1 | 10 |
| 00010 | FIRST EXPOSURE SEQUENCE | EXPOSURE | 11 |
| ... | ... | ... | ... |
| 00013 | CALIBRATION | MEASUREMENT 3 | 1 |
| 00020 | SECOND EXPOSURE SEQUENCE | TRANSFER | 1 |
| 00020 | SECOND EXPOSURE SEQUENCE | MEASUREMENT 1 | 2 |
| 00020 | SECOND EXPOSURE SEQUENCE | MEASUREMENT 2 | 3 |
| 00020 | SECOND EXPOSURE SEQUENCE | EXPOSURE | 4 |
| 00020 | SECOND EXPOSURE SEQUENCE | ... | 5 |
| 00020 | SECOND EXPOSURE SEQUENCE | TRANSFER | 6 |
| 00020 | SECOND EXPOSURE SEQUENCE | MEASUREMENT 1 | 7 |
| 00020 | SECOND EXPOSURE SEQUENCE | MEASUREMENT 2 | 8 |
| 00020 | SECOND EXPOSURE SEQUENCE | EXPOSURE | 9 |
| 00020 | SECOND EXPOSURE SEQUENCE | ... | 10 |
| 00020 | SECOND EXPOSURE SEQUENCE | TRANSFER | 11 |
| 00020 | SECOND EXPOSURE SEQUENCE | MEASUREMENT 1 | 12 |
| 00020 | SECOND EXPOSURE SEQUENCE | MEASUREMENT 2 | 13 |
| 00020 | SECOND EXPOSURE SEQUENCE | EXPOSURE | 14 |
| ... | ... | ... | ... |
| 00023 | CALIBRATION | MEASUREMENT 3 | 1 |
| ... | ... | ... | ... |

FIG. 12B

| PARAMETER A | PARAMETER B | ... | PARAMETER X | PARAMETER Y |
|---|---|---|---|---|
| - | - | ... | X1 | Y1 |
| - | - | ... | X1 | Y1 |
| - | - | ... | X1 | Y1 |
| - | - | ... | X1 | Y1 |
| - | - | ... | X1 | Y1 |
| - | - | ... | X1 | Y1 |
| - | - | ... | X1 | Y1 |
| - | - | ... | X1 | Y1 |
| - | - | ... | X1 | Y1 |
| - | - | ... | X1 | Y1 |
| - | - | ... | X1 | Y1 |
| ... | ... | ... | ... | ... |
| A1 | B1 | ... | - | - |
| - | - | ... | X2 | Y2 |
| - | - | ... | X2 | Y2 |
| - | - | ... | X2 | Y2 |
| - | - | ... | X2 | Y2 |
| - | - | ... | X2 | Y2 |
| - | - | ... | X2 | Y2 |
| - | - | ... | X2 | Y2 |
| - | - | ... | X2 | Y2 |
| - | - | ... | X2 | Y2 |
| - | - | ... | X2 | Y2 |
| - | - | ... | X2 | Y2 |
| - | - | ... | X2 | Y2 |
| - | - | ... | X2 | Y2 |
| - | - | ... | X2 | Y2 |
| ... | ... | ... | ... | ... |
| A2 | B2 | ... | - | - |
| ... | ... | ... | ... | ... |

| 1400 | 1401 | 1402 | 1403 | | | |
|---|---|---|---|---|---|---|
| | INPUT ORDER | JOB TYPE | PARAMETER A | PARAMETER B | ... | PARAMETER X | PARAMETER Y |
| | 00010 | FIRST EXPOSURE SEQUENCE | - | - | ... | X1 | Y1 |
| | 00011 | SECOND EXPOSURE SEQUENCE | - | - | ... | X11 | Y11 |
| | 00012 | SECOND EXPOSURE SEQUENCE | - | - | ... | X111 | Y111 |
| | 00013 | CALIBRATION | A1 | B1 | ... | - | - |
| | ... | ... | ... | ... | ... | ... | ... |
| | 00020 | FIRST EXPOSURE SEQUENCE | - | - | ... | X2 | Y2 |
| | 00021 | SECOND EXPOSURE SEQUENCE | - | - | ... | X22 | Y22 |
| | 00022 | SECOND EXPOSURE SEQUENCE | - | - | ... | X222 | Y222 |
| | 00023 | CALIBRATION | A2 | B2 | ... | - | - |
| | ... | ... | ... | ... | ... | ... | ... |

F I G. 15

| INPUT ORDER | JOB TYPE | EXECUTION FUNCTION | | | | | | | | | | | | | | |
|---|---|---|---|---|---|---|---|---|---|---|---|---|---|---|---|---|
| 00010 | FIRST EXPOSURE SEQUENCE | TRANS-FER | MEA-SURE-MENT 1 | EXPO-SURE | ... | TRANS-FER | MEA-SURE-MENT 1 | EXPO-SURE | MEA-SURE-MENT 1 | TRANS-FER | EXPO-SURE | . | . | . | . | . |
| 00011 | SECOND EXPOSURE SEQUENCE | TRANS-FER | MEA-SURE-MENT 1 | MEA-SURE-MENT 2 | EXPO-SURE | ... | TRANS-FER | MEA-SURE-MENT 1 | MEA-SURE-MENT 2 | EXPO-SURE | TRANS-FER | MEA-SURE-MENT 1 | MEA-SURE-MENT 2 | EXPO-SURE | . | . |
| 00012 | SECOND EXPOSURE SEQUENCE | TRANS-FER | MEA-SURE-MENT 1 | MEA-SURE-MENT 2 | EXPO-SURE | ... | TRANS-FER | MEA-SURE-MENT 1 | MEA-SURE-MENT 2 | EXPO-SURE | TRANS-FER | MEA-SURE-MENT 1 | MEA-SURE-MENT 2 | EXPO-SURE | . | . |
| 00013 | CALI-BRATION | MEA-SURE-MENT 3 | ... | . | . | . | . | . | . | . | . | . | . | . | . | . |
| 00020 | FIRST EXPOSURE SEQUENCE | TRANS-FER | MEA-SURE-MENT 1 | EXPO-SURE | ... | TRANS-FER | MEA-SURE-MENT 1 | EXPO-SURE | MEA-SURE-MENT 1 | TRANS-FER | EXPO-SURE | . | . | . | . | . |
| 00021 | SECOND EXPOSURE SEQUENCE | TRANS-FER | MEA-SURE-MENT 1 | MEA-SURE-MENT 2 | EXPO-SURE | ... | TRANS-FER | MEA-SURE-MENT 1 | MEA-SURE-MENT 2 | EXPO-SURE | TRANS-FER | MEA-SURE-MENT 1 | MEA-SURE-MENT 2 | EXPO-SURE | . | . |
| 00022 | SECOND EXPOSURE SEQUENCE | TRANS-FER | MEA-SURE-MENT 1 | MEA-SURE-MENT 2 | EXPO-SURE | ... | TRANS-FER | MEA-SURE-MENT 1 | MEA-SURE-MENT 2 | EXPO-SURE | TRANS-FER | MEA-SURE-MENT 1 | MEA-SURE-MENT 2 | EXPO-SURE | . | . |
| 00023 | CALI-BRATION | MEA-SURE-MENT 3 | ... | . | . | . | . | . | . | . | . | . | . | . | . | . |
| ... | ... | ... | ... | ... | ... | ... | ... | ... | ... | ... | ... | ... | ... | ... | ... | ... |

FIG. 17A

| | 401 | 402 | 403 | 404 | 405 |
|---|---|---|---|---|---|
| 1700 | JOB ID | JOB TYPE | FUNCTION NAME | EXECUTION ORDER | LEAK OCCURRENCE |
| | 00010 | FIRST EXPOSURE SEQUENCE | TRASFER | 1 | NO |
| | 00010 | FIRST EXPOSURE SEQUENCE | MEASUREMENT 1 | 2 | NO |
| | 00010 | FIRST EXPOSURE SEQUENCE | EXPOSURE | 3 | NO |
| | 00010 | FIRST EXPOSURE SEQUENCE | ... | 4 | ... |
| | 00010 | FIRST EXPOSURE SEQUENCE | TRASFER | 5 | NO |
| | 00010 | FIRST EXPOSURE SEQUENCE | MEASUREMENT 1 | 6 | NO |
| | 00010 | FIRST EXPOSURE SEQUENCE | EXPOSURE | 7 | NO |
| | 00010 | FIRST EXPOSURE SEQUENCE | ... | 8 | ... |
| | 00010 | FIRST EXPOSURE SEQUENCE | TRASFER | 9 | NO |
| | 00010 | FIRST EXPOSURE SEQUENCE | MEASUREMENT 3 | 10 | NO |
| | 00010 | FIRST EXPOSURE SEQUENCE | MEASUREMENT 1 | 11 | NO |
| 1702 | 00010 | FIRST EXPOSURE SEQUENCE | EXPOSURE | 12 | YES |
| | 00020 | SECOND EXPOSURE SEQUENCE | TRASFER | 1 | NO |
| | 00020 | SECOND EXPOSURE SEQUENCE | MEASUREMENT 1 | 2 | NO |
| | 00020 | SECOND EXPOSURE SEQUENCE | MEASUREMENT 2 | 3 | NO |
| | 00020 | SECOND EXPOSURE SEQUENCE | EXPOSURE | 4 | NO |
| | 00020 | SECOND EXPOSURE SEQUENCE | ... | 5 | ... |
| | 00020 | SECOND EXPOSURE SEQUENCE | TRASFER | 6 | NO |
| | 00020 | SECOND EXPOSURE SEQUENCE | MEASUREMENT 1 | 7 | NO |
| | 00020 | SECOND EXPOSURE SEQUENCE | MEASUREMENT 2 | 8 | NO |
| | 00020 | SECOND EXPOSURE SEQUENCE | EXPOSURE | 9 | NO |
| | 00020 | SECOND EXPOSURE SEQUENCE | ... | 10 | ... |
| | 00020 | SECOND EXPOSURE SEQUENCE | TRASFER | 11 | NO |
| | 00020 | SECOND EXPOSURE SEQUENCE | MEASUREMENT 1 | 12 | NO |
| | 00020 | SECOND EXPOSURE SEQUENCE | MEASUREMENT 2 | 13 | NO |
| 1703 | 00020 | SECOND EXPOSURE SEQUENCE | EXPOSURE | 14 | YES |
| 1704 | 00030 | CALIBRATION | MEASUREMENT 3 | 1 | NO |
| 1705 | 00040 | CALIBRATION | MEASUREMENT 3 | 1 | YES |
| | 00040 | CALIBRATION | MEASUREMENT 3 | 2 | NO |
| | ... | ... | ... | ... | ... |

FIG. 17B

| CONTROL INFORMATION | PARAMETER A | PARAMETER B | ... | PARAMETER X | PARAMETER Y | JOB CREATOR | JOB CREATION TIME AND DATE |
|---|---|---|---|---|---|---|---|
| APPEARS FIRST | - | - | ... | X1 | Y1 | Y.Sato | 20070901T101000 |
| APPEARS FIRST | - | - | ... | X1 | Y1 | Y.Sato | 20070901T101000 |
| APPEARS FIRST | - | - | ... | X1 | Y1 | Y.Sato | 20070901T101000 |
| ... | - | - | ... | X1 | Y1 | Y.Sato | 20070901T101000 |
| - | - | - | ... | X1 | Y1 | Y.Sato | 20070901T101000 |
| - | - | - | ... | X1 | Y1 | Y.Sato | 20070901T101000 |
| ... | - | - | ... | X1 | Y1 | Y.Sato | 20070901T101000 |
| MEASUREMENT 3 INCLUDED | - | - | ... | X1 | Y1 | Y.Sato | 20070901T101000 |
| MEASUREMENT 3 INCLUDED | - | - | ... | X1 | Y1 | Y.Sato | 20070901T101000 |
| MEASUREMENT 3 INCLUDED | - | - | ... | X1 | Y1 | Y.Sato | 20070901T101000 |
| APPEARS FIRST | - | - | ... | X2 | Y2 | J.Takeda | 20070901T110000 |
| APPEARS FIRST | - | - | ... | X2 | Y2 | J.Takeda | 20070901T110000 |
| APPEARS FIRST | - | - | ... | X2 | Y2 | J.Takeda | 20070901T110000 |
| APPEARS FIRST | - | - | ... | X2 | Y2 | J.Takeda | 20070901T110000 |
| ... | - | - | ... | X2 | Y2 | J.Takeda | 20070901T110000 |
| - | - | - | ... | X2 | Y2 | J.Takeda | 20070901T110000 |
| - | - | - | ... | X2 | Y2 | J.Takeda | 20070901T110000 |
| APPEARS LAST | - | - | ... | X2 | Y2 | J.Takeda | 20070901T110000 |
| APPEARS LAST | - | - | ... | X2 | Y2 | J.Takeda | 20070901T110000 |
| APPEARS LAST | - | - | ... | X2 | Y2 | J.Takeda | 20070901T110000 |
| NO REPETITION | A1 | B0 | ... | - | - | - | 20070901T111000 |
| APPEARS FIRST | A1 | B1 | ... | - | - | - | 20070901T111000 |
| APPEARS LAST | A1 | B1 | ... | - | - | - | 20070901T111000 |
| ... | ... | ... | ... | ... | ... | ... | ... |

FIG. 20

| JOB TYPE 501 | FUNCTION NAME 502 | LEAK CONDITION 2001 | PEAK AMOUNT (BYTES) 504 | LEAKAGE AMOUNT (BYTES) 505 |
|---|---|---|---|---|
| FIRST EXPOSURE SEQUENCE | EXPOSURE | (PARAMETER X=X1) AND (PARAMETER Y=Y1) AND (GROUP INCLUDES MEASUREMENT 3) | 31M | 105K |
| SECOND EXPOSURE SEQUENCE | MEASUREMENT 1 | (PARAMETER X=X2) AND (PARAMETER Y=Y2) AND (LAST GROUP) | 43M | 301K |
| CALIBRATION | MEASUREMENT 3 | (PARAMETER A=A1) AND (PARAMETER B=B1) AND (FIRST GROUP) | 18M | 100K |
| ... | ... | ... | ... | ... |

2000

PREVENTING MEMORY EXHAUSTION OF INFORMATION PROCESSING APPARATUS BASED ON THE PREDICTED PEAK MEMORY USAGE AND TOTAL MEMORY LEAKAGE AMOUNT USING HISTORICAL DATA

BACKGROUND OF THE INVENTION

1. Field of the Invention

The present invention relates to a support apparatus for an information processing apparatus, a support method, and a computer program.

2. Description of the Related Art

In an information processing apparatus, when software utilizes memory, the software acquires a memory area from a memory management mechanism such as an operating system, and frees up the memory area after using the memory. As techniques for acquiring and freeing up a memory area, malloc/free provided as a library function in the C programming language, a new/delete operator in the C++ programming language and so on are widely used. When the software does not free up the used memory area after using the memory, the memory area continues to occupy the resource of the information processing apparatus uselessly without being used by other software until the operation of the information processing apparatus ends. This phenomenon is called "memory leakage" (hereinafter referred to simply as "leakage"), and occurs due to a bug that prevents the software from freeing up memory. Generally speaking, it is difficult to detect such a leak using a static analysis testing method in which the structure of a program is statically analyzed, resulting in a high false detection rate. On the other hand, as for a dynamic analysis in which the actual state of a program during execution is analyzed, commercial tools that check whether or not a memory leak has occurred within a single process are widely used. Herein, "process" means an execution unit of software managed by an operating system. However, in software that includes a plurality of processes and shares data among the processes using a shared memory, there is a case in which an area of the shared memory acquired by one of the processes is freed up by another process. In such a case, it is not possible to accurately detect a memory leak by only checking a single process.

Usually, software is subjected to test processes before shipment to find and remove bugs, and then shipped as a product. However, in some of the software for use in industrial manufacturing apparatuses, it is extremely difficult to completely remove such bugs that prevent the software from freeing up memory in the pre-shipment test processes. For example, in a semiconductor exposure apparatus in which printing is performed on a semiconductor wafer, the operation of the apparatus is determined based on the combinations of a recipe in which the exposure conditions and the procedure are written with apparatus settings. Such combinations include a large number of parameters, and are created by a user based on the production planning of the factory production line after the shipment of the software. Because the necessary combinations vary from user to user, in order to completely remove a bug that prevents the software from freeing up memory, it is necessary to check all of the settings combinations in test processes. However, it is not practical to perform such check-ups when software has a large number of parameters.

If software that contains such a bug that prevents the software from freeing up memory is continuously operated, the usable memory area of the information processing apparatus decreases gradually due to the occurrence of leaks. As a result, the performance of the information processing apparatus decreases and, at the same time, the operation of the apparatus becomes unstable. If such a case occurs, action has to be taken to restore the performance and stability of the information processing apparatus, such as shutting down or restarting the information processing apparatus to initialize the memory area. However, because a semiconductor exposure apparatus is assumed to be operated continuously over several weeks once it starts production based on the production planning, it is not possible to immediately restart the information processing apparatus. This is because, if the information processing apparatus is restarted, initialization and hardware adjustment are required, during which other apparatuses in the factory production line also have to be shut down, and the amount of production has to be adjusted. In addition, in such a semiconductor exposure apparatus, task instructions are inputted on a lot by lot basis, each lot including a plurality of wafers and, if the apparatus is restarted while the wafers in a lot are being processed, some of the wafers in the lot might have to be discarded. As described above, the sudden occurrence of a need to restart the information processing apparatus causes significant harm to the user. However, if the time at which a restart is required is predicted in advance, the user can review and optimize production planning based on the prediction. Accordingly, a technique for predicting the time at which a restart of the information processing apparatus is required with high accuracy is being sought.

The influence that memory leaks have on the information processing apparatus will be described with reference to FIGS. 21A and 21B. FIG. 21A is a diagram illustrating memory usage status when a job that causes a leak is not present in the information processing apparatus. In FIG. 21A, it is assumed that jobs J1 to J6 are to be executed by the information processing apparatus. Memory usage 2101 is the amount of memory required when the job J1 is executed. When a job that causes a leak is not present in the information processing apparatus, in all the jobs, memory usage does not exceed the upper limit of memory usage, so the memory never becomes exhausted.

In contrast, FIG. 21B is a diagram illustrating memory usage status when a job that causes a leak is present in the information processing apparatus. A memory leak 2102 occurs after the job J1 ends. This memory area becomes unusable when the job J2 is executed, so the memory capacity required by the job J2 increases as compared to when no leak is present. Furthermore, such a leak is accumulated, and when the job J4 is executed, the total of the value of accumulated leakage amounts and the memory usage used by the job J4 exceeds the upper limit of memory usage. In this case, the operation of the information processing apparatus becomes unstable, causing a possibility that the information processing apparatus might shut down.

There is no existing technique effective in predicting the time at which the memory of the information processing apparatus will be exhausted. As techniques in other fields that can be applied to the prediction of the time at which the memory of the information processing apparatus will be exhausted, for example, the detection of the degree of consumption of consumables and the prediction of the end of the service life thereof are conceivable.

Japanese Patent Laid-Open No. H08-220199 describes a method in which the modes used and operating time are recorded from the beginning of battery use and the remaining service life of the battery is calculated using the degree of consumption that has been stored in advance before shipment. Also, Japanese Patents Laid-Open Nos. 2005-250302 and 2004-168062 describe a method in which an estimated amount of consumables required for a job inputted into the printer and the actual remaining amount of consumables are compared to determine whether or not the print job can be accomplished. However, these methods determine the degree of consumption based on the theoretical values or designed values set during production, that is, they do not consider consumption due to unexpected factors after shipment. Accordingly, these methods cannot be applied to apparatuses, such as a semiconductor exposure apparatus, in which a leak occurs after shipment. In addition, because these methods do not consider plans for future use, they cannot predict service life in advance.

Japanese Patent Laid-Open No. 2005-258585 describes a method in which replacement parts of a molding machine are automatically ordered taking production planning into consideration. However, this method determines the degree of consumption of the molding machine based on the theoretical values or designed values set during production, so it cannot be applied to apparatuses that cannot include an enormous number of combinations of setting parameters before shipment.

The present invention provides a technique of predicting the time at which the memory of an information processing apparatus will be exhausted due to memory leaks.

SUMMARY OF THE INVENTION

According to one aspect of the present invention, a support apparatus that supports an information processing apparatus that executes a job according to specified settings is provided. The support apparatus comprising: a storage unit configured to associate and store settings of an executed job, a leakage amount of a memory leak caused by the executed job, and a peak amount of memory used by the executed job; an acquisition unit configured to acquire a job group that is going to be input to the information processing apparatus and settings for executing each job; a prediction unit configured to compare the settings stored in the storage unit and the settings acquired by the acquisition unit for a job included in the job group, and predict a leakage amount and a peak amount when the job is executed by the information processing apparatus; and a determination unit configured to determine whether or not there is a job in the job group in which a total value of the predicted peak amount of the job and the predicted leakage amount of a job executed preceding the job exceeds a memory capacity of the information processing apparatus that is allowed to execute the job group.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 3A is a diagram used to illustrate exemplary parameter information 300 according to an embodiment of the present invention.

FIG. 3B is a diagram used to illustrate exemplary execution function information 310 according to the first embodiment of the present invention.

FIGS. 4A-1 and 4A-2 are diagrams used to illustrate exemplary function leak information 400 according to the first Embodiment of the present invention.

FIG. 5 is a diagram used to illustrate an exemplary leak pattern 207 according to an embodiment of the present invention.

FIG. 7 is a diagram used to illustrate exemplary sub-function leak information according to an embodiment of the present invention.

FIG. 9 is a flowchart illustrating an exemplary operation for calculating a leakage amount and a peak amount according to an embodiment of the present invention.

FIG. 10 is a diagram used to illustrate an exemplary production plan 208 according to an embodiment of the present invention.

FIG. 11A is a diagram used to illustrate exemplary recipe information 1100 according to an embodiment of the present invention.

FIG. 11B is a diagram used to illustrate exemplary reticle data settings 1110 according to an embodiment of the present invention.

FIGS. 12A and 12B are diagrams used to illustrate an exemplary function execution plan 210 according to the first embodiment of the present invention.

FIG. 14 is a diagram used to illustrate exemplary execution parameter information 1400 according to the first embodiment of the present invention.

FIG. 15 is a diagram used to illustrate an exemplary function execution order 1500 according to the first embodiment of the present invention.

FIGS. 17A and 17B are diagrams used to illustrate exemplary function leak information 1700 according to the second embodiment of the present invention.

FIG. 20 is a diagram used to illustrate an exemplary leak pattern 2000 according to the second embodiment of the present invention.

DESCRIPTION OF THE EMBODIMENTS

Hereinafter, embodiments of the present invention will be described with reference to the accompanying drawings. The present invention is applied to a support apparatus configured to support an information processing apparatus that executes a job based on specified settings. The embodiments given below employ a semiconductor exposure apparatus as such an information processing apparatus. A job executed by the semiconductor exposure apparatus is broken into one or more functions, but by treating a combination of jobs and functions as a single job, the semiconductor exposure apparatus can be regarded as an information processing apparatus described above.

<First Embodiment>
Hardware Configuration

Figure 1:
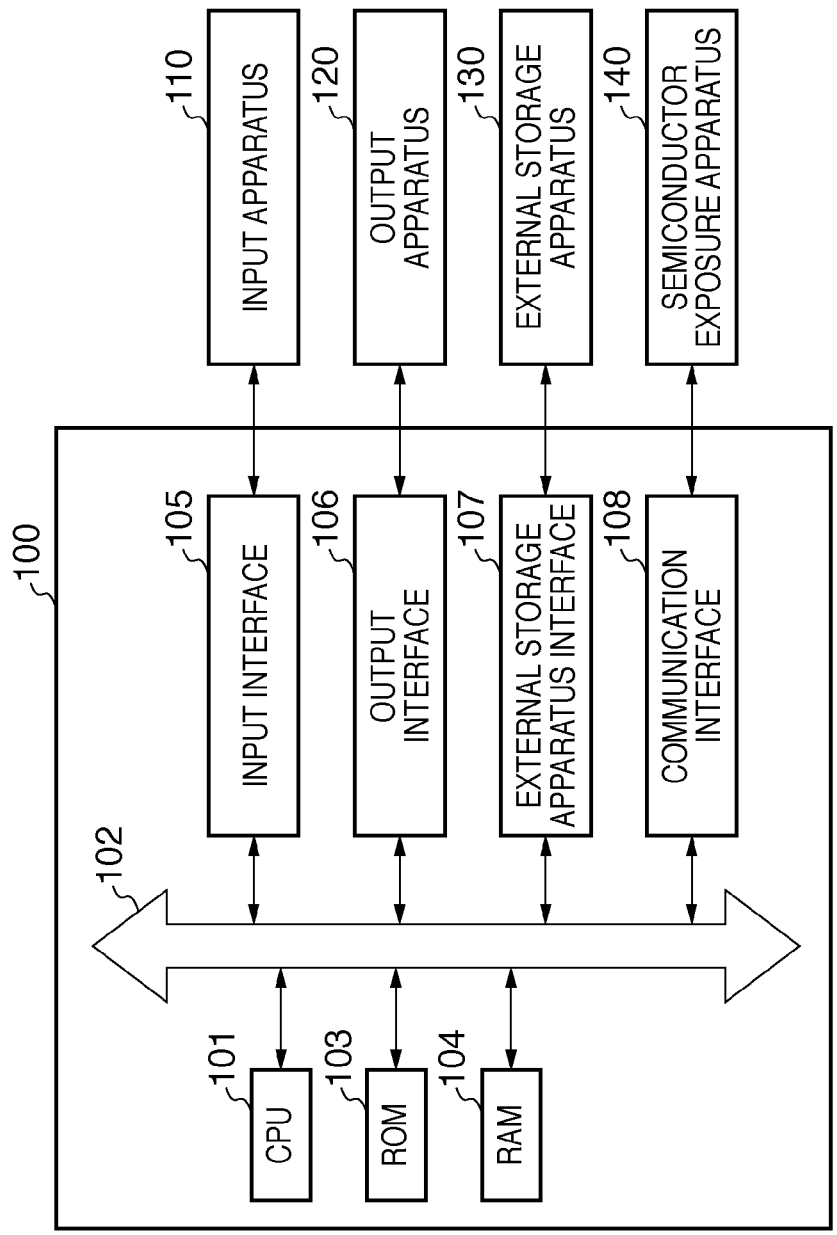
FIG. 1 is an exemplary hardware block diagram of a support apparatus 100 according to an embodiment of the present invention.

A hardware configuration of a support apparatus 100 of the present embodiment will be described with reference to FIG. 1. FIG. 1 is an exemplary hardware block diagram of the support apparatus 100 of the present embodiment. A CPU 101 controls each of the components of the support apparatus 100 via a bus 102. A ROM 103 is a read only memory accessible by the CPU 101 via the bus 102, and stores various programs and the like which will be described later. A RAM 104 is a readable and writable random access memory, and stores various data and the like. The programs stored in the ROM 103 are read out by the RAM 104 when they are executed, but it is also possible to execute the programs while they are stored in the ROM 103.

An input apparatus 110 can be a keyboard, a mouse, a tablet or the like that can receive an input from the user, and is connected to the bus 102 via an input interface 105. An output apparatus 120 can be a display such as a CRT or an LCD, a printer, a plotter or the like, and is connected to the bus 102 via an output interface 106. An external storage apparatus 130 can be a HDD, a FDD, a CD-ROM drive, a MD drive or the like, and is connected to the bus 102 via an external storage apparatus interface 107. Various programs may be read into the RAM 104 from the external storage apparatus 130. A communication interface 108 provides communication with a semiconductor exposure apparatus 140 that is an apparatus to be supported. In FIG. 1, the support apparatus 100 is expressed as an apparatus independent of the semiconductor exposure apparatus 140, but the support apparatus 100 may be a part of the semiconductor exposure apparatus 140.

Software Configuration

Figure 2:
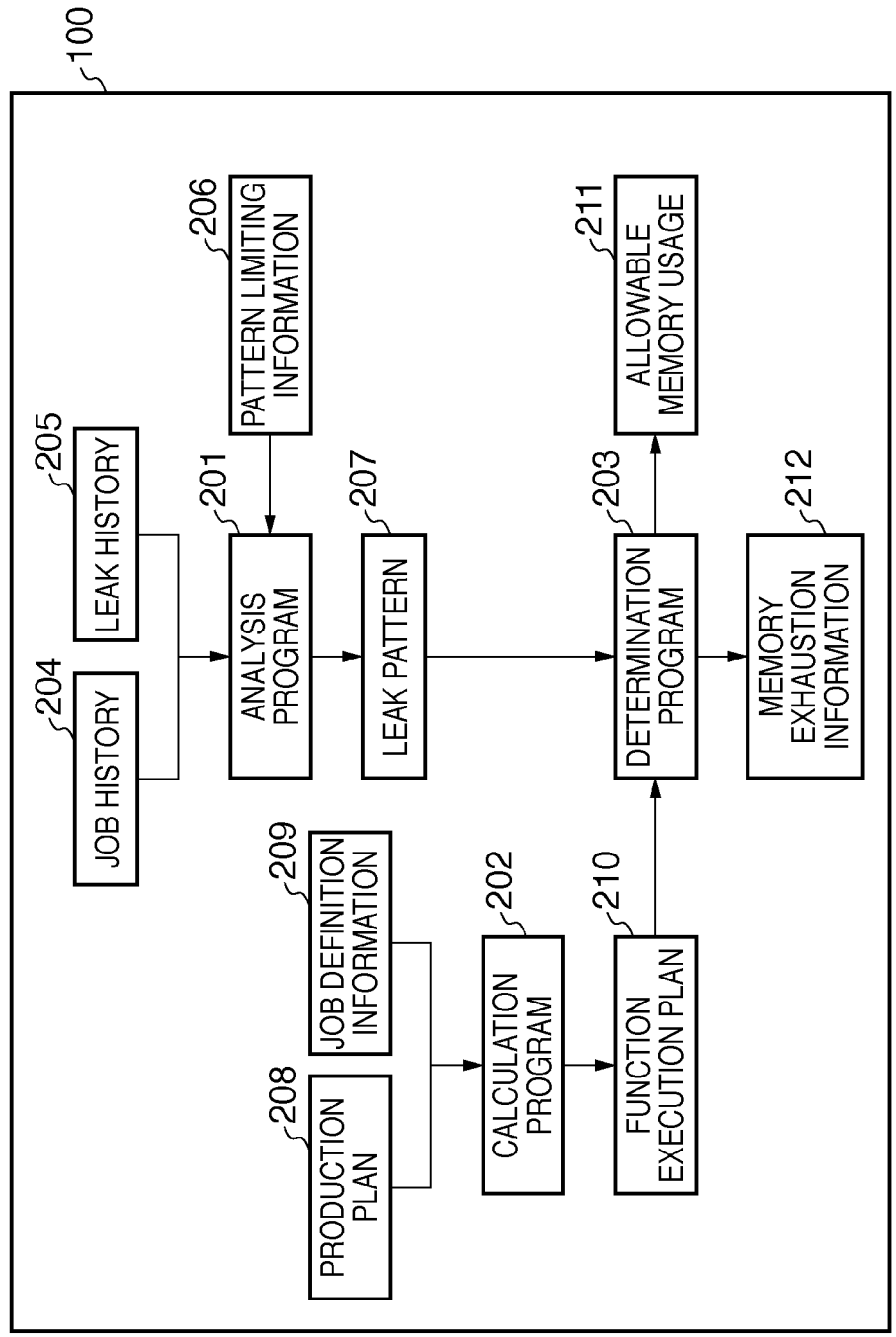
FIG. 2 is an exemplary software block diagram of the support apparatus 100 according to an embodiment of the present invention.

A software configuration of the support apparatus 100 according to the present embodiment will be described with reference to FIG. 2. FIG. 2 is an exemplary software block diagram of the support apparatus 100 of the present embodiment. The support apparatus 100 includes programs, including an analysis program 201, a calculation program 202 and a determination program 203. The support apparatus 100 further includes data, including a job history 204, a leak history 205, pattern limiting information 206, a leak pattern 207, a production plan 208, job definition information 209, a function execution plan 210, allowable memory usage 211 and memory exhaustion information 212. The present embodiment will be described in the context in which all of the various programs and various data are stored in the single support apparatus 100. However, it is also possible to adopt a configuration in which some of them are stored in other computer nodes, and a series of processes are performed using the plurality of computer nodes.

The analysis program 201 calculates settings in which a leak occurs in the semiconductor exposure apparatus 140 and the leakage amount and peak amount of that settings based on the execution results of the jobs input into the semiconductor exposure apparatus 140 in the past. Specifically, the job history 204, the leak history 205 and the pattern limiting information 206 are input, and the leak pattern 207 is output. The job history 204 is information regarding the settings of the jobs input into the semiconductor exposure apparatus in the past. The leak history 205 is information regarding the peak amount of memory used to execute the jobs inputted into the semiconductor exposure apparatus 140 in the past and the leakage amount of memory leaks that have occurred. The pattern limiting information 206 is information that limits the settings to be included in a leak pattern 207 when creating the leak pattern 207. The leak pattern 207 is information regarding combinations of functions and settings in which a leak has occurred that is extracted from the execution history of the jobs executed in the past.

The calculation program 202 calculates functions that are actually executed by the semiconductor exposure apparatus 140 based on the jobs that the user is going to execute with the semiconductor exposure apparatus 140. Specifically, the production plan 208 and the job definition information 209 are input and the function execution plan 210 is output. The production plan 208 is information regarding jobs that are going to be inputted into the semiconductor exposure apparatus 140, and is created by, for example, the user of the semiconductor exposure apparatus 140. The job definition information 209 is information that defines the details of a job. The function execution plan 210 is information that prescribes the functions that are going to be actually executed by the semiconductor exposure apparatus 140 and the order of the functions.

The determination program 203 is a program that determines whether or not the memory of the semiconductor exposure apparatus 140 will be exhausted when the jobs that are going to be executed are executed. Specifically, the leak pattern 207, the function execution plan 210 and the allowable memory usage 211 are input, and the memory exhaustion information 212 is output. The allowable memory usage 211 is the memory capacity that is allowed for the software of the semiconductor exposure apparatus to use to execute the jobs. The memory exhaustion information 212 is information regarding whether or not the memory will be exhausted, and in which function of which job the memory will be exhausted if the memory becomes exhausted.

As described above, the software used in the semiconductor exposure apparatus 140 determines whether or not the memory will be exhausted based on the information accumulated when it is used by the user after shipment. Next, the operation performed by each program and the content of each piece of data will be described in detail.

Analysis Program 201 and Input/Output Data Thereof

The analysis program 201 calculates the settings in which a leak occurs in the semiconductor exposure apparatus 140 and the leakage amount and peak amount of those settings based on the execution results of the jobs inputted into the semiconductor exposure apparatus 140 in the past. First, the job history 204, the leak history 205 and the pattern limiting information 206 that are input data will be described.

The job history 204 will be described with reference to FIGS. 3A and 3B. The job history 204 is information regarding the settings of the jobs input into the semiconductor exposure apparatus in the past. The job history 204 may be stored in the semiconductor exposure apparatus 140, and the support apparatus 100 may acquire the job history 204 from the semiconductor exposure apparatus 140. Alternatively, the support apparatus 100 may store the job history 204. The job history 204 includes parameter information 300 and execution function information 310.

FIG. 3A is a diagram illustrating exemplary parameter information 300. The parameter information 300 can be expressed in the form of a table as shown in FIG. 3A, but the form of expression is not limited thereto. Other information which will be described below can also be expressed in the form of a table, but the form of expression is not limited thereto. Also, the values of each piece of information are directly written into the table, but they may be stored dispersively in several files or database tables.

In the parameter information 300, a record is created for each job input to the semiconductor exposure apparatus 140. In the parameter information 300, each time an input job is finished, a record of the job is added. The parameter information 300 includes job ID 301, job type 302, parameter settings 303 and job related information 304. The job ID 301 is an identifier assigned uniquely to each job inputted into the semiconductor exposure apparatus 140. The job type 302 is the type of job executed. Different job IDs 301 are assigned to different jobs even though they are of the same job type 302. The parameter settings 303 are set values for parameters specified to execute jobs. For many of the parameters, a value is set as shown in a cell 306, but for some parameters, no value is set as shown in a cell 305. The job related information 304 is information that is related to the jobs such as the job creator.

FIG. 3B is a diagram illustrating exemplary execution function information 310. The execution function information 310 may be stored in the semiconductor exposure apparatus 140, and the support apparatus 100 may acquire the execution function information 310 from the semiconductor exposure apparatus 140. Alternatively, the support apparatus 100 may store the execution function information 310. In the execution function information 310, a record is created for each job that was input into the semiconductor exposure apparatus 140 and executed in the past. In the execution function information 310, each time an inputted job is finished, a record of the job is added. Job ID 311 and job type 312 are the same as the job ID 301 and the job type 302 described in FIG. 3A respectively. Function execution history 313 is a history of the functions executed in each job and the order in which the functions were executed. There are cases in which a single job includes a function of the same name that is repeatedly executed multiple times. Taking a record 314, for example, the jobs "Transfer", "Measurement 1" and "Exposure" are repeatedly executed. This is to perform exposure on a plurality of wafers or perform measurement repeatedly in a single job.

The leak history 205 will be described with reference to FIGS. 4A-1, 4A-2, and 4B. The leak history 205 is information regarding the memory usage used to execute the jobs input to the semiconductor exposure apparatus 140 in the past and the amount of leakage that occurred. The leak history 205 may be stored in the semiconductor exposure apparatus 140, and the support apparatus 100 may acquire the leak history 205 from the semiconductor exposure apparatus 140. Alternatively, the support apparatus 100 may store the leak history 205. The leak history 205 includes function leak information 400 and leakage amount information 410.

FIGS. 4A-1 and 4A-2 are diagrams illustrating exemplary function leak information 400. In the function leak information 400, a record is created for each function executed in each job. In the function leak information 400, each time an input job is finished, records regarding the functions of the job are added.

The function leak information 400 includes a job ID 401, a job type 402, a function name 403, an execution order 404, a leak occurrence 405, parameter settings 406 and job related information 407. The job ID 401, the job type 402, the parameter settings 406 and the job related information 407 are the same as those of FIG. 3A. The function name 403 is the name of a function that was executed in each job. The execution order 404 is the order of a function executed in each job. The leak occurrence 405 is a flag that indicates whether or not a leak has occurred in each function. With this flag, for example, it can be seen that a leak occurred in "Exposure" that was executed third in the job whose job ID 401 is "00010".

Figure 4B:
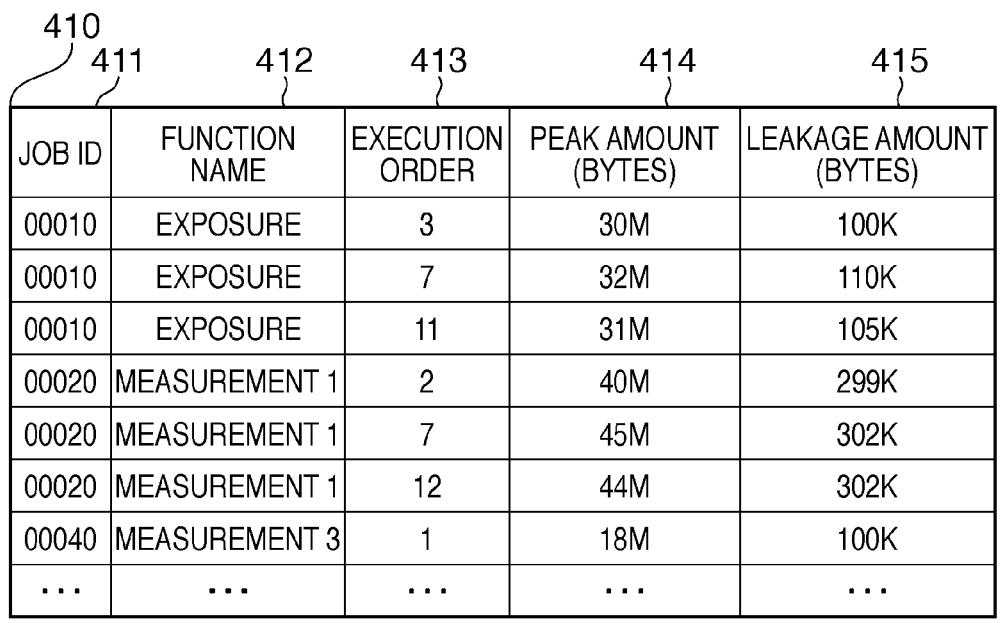
FIG. 4B is a diagram used to illustrate exemplary leakage amount information 410 according to the first embodiment of the present invention.

FIG. 4B is a diagram illustrating exemplary leakage amount information 410. In the leakage amount information 410, a record is created for each function of each job in which a leak occurred. In the leakage amount information 410, each time the execution of an input function ends, a record of the function is added. The leakage amount information 410 includes job ID 411, function name 412, execution order 413, peak amount 414 and leakage amount 415. The job ID 411, the function name 412 and the execution order 413 are the same as those of FIGS. 4A-1 and 4A-2. The peak amount 414 is the maximum amount of memory used by the semiconductor exposure apparatus 140 when executing the function. The leakage amount 415 is the size of a memory leak caused by the semiconductor exposure apparatus 140 as a result of executing the function.

The semiconductor exposure apparatus 140 tracks the memory usage each time each function of a job is executed, and defines the maximum value as the peak amount 414. Also, the semiconductor exposure apparatus 140 assumes that the memory area that is not freed up when the execution of the function ends is a memory area in which a memory leak has occurred, records it as the leakage amount 415, and frees up the leaked memory area.

The pattern limiting information 206 is information that limits the settings to be included in the leak pattern 207 when creating it. The pattern limiting information 206 may be specified in the support apparatus 100 by the user, or the support apparatus 100 may automatically specify the pattern limiting information 206. For example, a use can be conceived in which, after a module that is part of the software that constitutes the semiconductor exposure apparatus 140 is updated, the parameters referred to by that module are specified as the pattern limiting information 206 and, by doing so, a leak is checked intensively in that module with no operation history.

Next, the leak pattern 207 that is output data will be described. FIG. 5 is a diagram illustrating an exemplary leak pattern 207 of the present embodiment. The leak pattern 207 is information regarding combinations of functions and settings in which a leak occurred that is extracted from the execution history of the jobs executed in the past. In the leak pattern 207, a record is created for each combination of a function and a condition in which a leak occurred. Job type 501 and function name 502 are the type of the job and the name of the function in which a leak occurred. Leak condition 503 is a setting that was specified when executing a function in which a leak occurred. Peak amount 504 and leakage amount 505 are the peak amount of memory used to execute the function in which a leak occurred and the amount of leakage that occurred, respectively.

Figure 6:
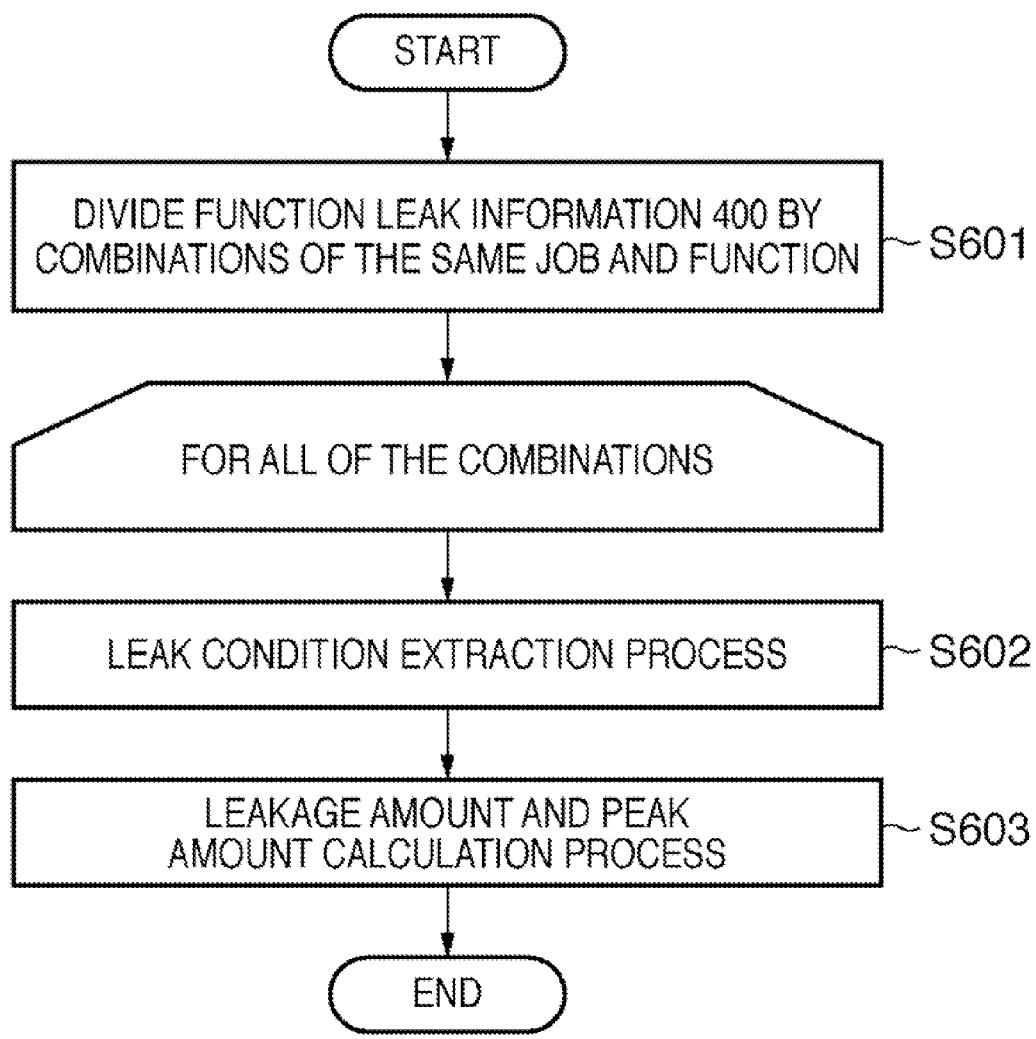
FIG. 6 is a flowchart illustrating an exemplary operation performed by an analysis program 201 according to the first embodiment of the present invention.
Figure 8:
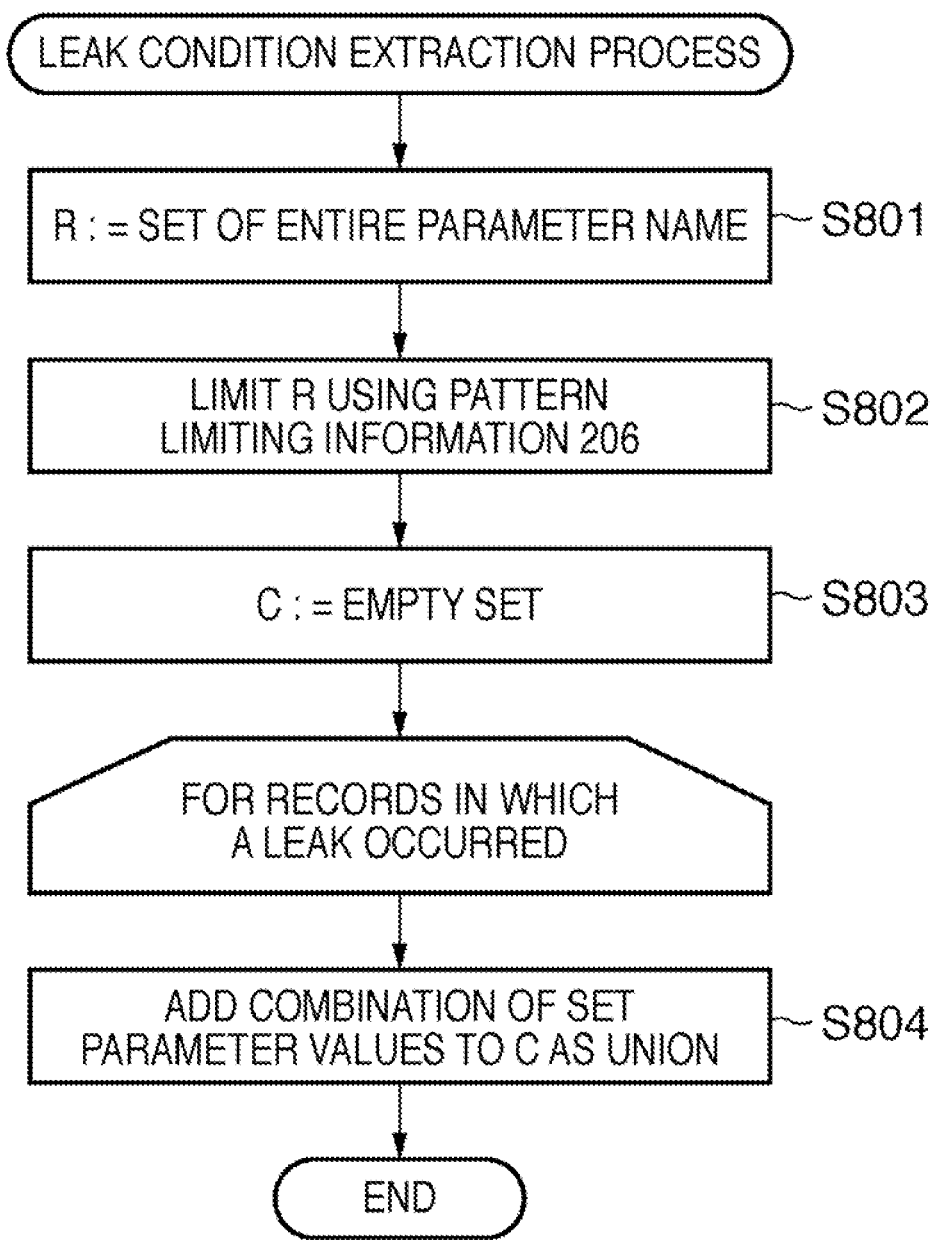
FIG. 8 is a flowchart illustrating an exemplary operation for extracting a leak condition according to an embodiment of the present invention.

Next, an operation performed by the analysis program 201 will be described with reference to FIGS. 6, 8 and 9. FIG. 6 is a flowchart illustrating an exemplary operation of the analysis program 201 of the present embodiment. This operation is executed by the CPU 101 processing the analysis program 201.

In step S601, the CPU 101 extracts the records of a combination of the same job type 402 and the same function name 403 from among the function leak information 400 shown in FIGS. 4A-1 and 4A-2 so as to create sub-function leak information. As a result, sub-function leak information is generated in a number equal to the number calculated by multiplying the number of job types by the number of function types. By way of example, sub-function leak information 700 created using a combination of the job type 402 being "Calibration" and the function name 403 being "Measurement 3" is shown in FIG. 7. FIG. 7 is a diagram illustrating exemplary sub-function leak information. The records in which a leak occurred are identified by referring to the leak occurrence 405 of the sub-function leak information 700, and the specified records are represented by $t_1$ to $t_M$, respectively. The entirety of the records is represented by T. For example, a record 701 corresponds to $t_1$. Each record is assumed to have N types of parameters, and the parameter names are represented by $p_1$ to $p_N$, respectively. For example, "Parameter A 702" corresponds to $p_1$. The parameter values of a record $t_k$ are assumed to be $t_{k,1}$ to $t_{k,N}$. For example, the parameter value A1 of a cell 703 corresponds to $t_{1,1}$.

Reverting to FIG. 6, the CPU 101 executes steps S602 and S603 for all of the sub-function leak information generated in step S601. In step S602, the CPU 101 extracts a parameter condition under which a leak occurred. In step S603, the CPU 101 calculates the memory leakage amount and memory usage for each function in which a leak occurred. These processes will be described in detail below.

The process of step S602 shown in FIG. 6 will be described in detail with reference to FIG. 8. FIG. 8 is a flowchart illustrating an exemplary operation of a process for extracting a leak condition according to the present embodiment. In the present embodiment, it is assumed that whether or not a leak occurs when executing a function depends only on the combination of parameters. That is, it is assumed here that a leak occurs regardless of the order of the functions executed if it is the same combination of parameters. In this case, only the combination of parameters serves as a leak condition. A case in which the leak condition depends on the execution order of the functions of a job sequence will be described in the second embodiment.

In step S801, the CPU 101 assigns a set $\{p_1, \ldots, p_N\}$ of entire parameter names of the parameter settings 406 to a variable R that represents a candidate for the parameter name of a leak condition as an initial value. As the variable R, only a parameter that directly affects a logic operation such as the parameter settings 406 is specified, and a parameter that is irrelevant to the occurrence of a leak such as job related information 407 is not specified.

In step S802, the CPU 101 updates the variable R based on the pattern limiting information 206. For example, when the pattern limiting information 206 is specified such that the leak condition is limited only to $p_\alpha, p_\beta, \ldots, p_\omega$, the CPU 101 updates R to R:=R∩$\{p_\alpha, p_\beta, \ldots, p_\omega\}$. When, on the other hand, the pattern limiting information 206 is specified such that $p_\alpha, p_\beta, \ldots, p_\omega$ are excluded from the leak condition, CPU 101 updates R to R:=R−$\{p_\alpha, p_\beta, \ldots, p_\omega\}$.

In step S803, the CPU 101 initializes a variable C that represents a set of conditions under which a leak occurs for the combination of a job and a function to an empty set.

The CPU 101 repeats step S804 for each of the records $t_k$ in which a leak occurred. In step S804, the CPU 101 adds the combination of parameter values of a record in which a leak occurred to the variable C as a union. For example, in the case of R=$\{p_\alpha, p_\beta, \ldots, p_\omega\}$, the combination of parameter values for the record $t_k$ will be $p_\alpha = t_{k,\alpha} \wedge p_\beta = t_{k,\beta} \wedge \ldots \wedge p_\omega = t_{k,\omega}$.

Through these steps, leak conditions 503 for each combination of the job type 501 and the function name 502 as shown in FIG. 5 is extracted.

In the example given above, the CPU 101 selects a parameter value from among a plurality of candidates, but by performing area division or the like in advance; even when the parameter values may take arbitrary values or character strings, such selection is possible.

Next, the process of step S603 shown in FIG. 6 will be described in detail with reference to FIG. 9. FIG. 9 is a flowchart illustrating an exemplary operation of a process for calculating a leakage amount and a peak amount according to the present embodiment. In the present embodiment, it is assumed that the leakage amount and the peak amount that occur for each leak condition are substantially constant values.

In step S901, the CPU 101 extracts records that satisfy the extracted leak conditions from among the records of the sub-function leak information.

In step S902, the CPU 101 refers to the leakage amount information 410 using the job ID 401, the function name 403 and the execution order 404 as keys, and obtains the peak amount 414 and the leakage amount 415 that are associated with each record.

In step S903, the CPU 101 calculates the average value of the peak amounts 414 and the average value of the leakage amounts 415.

Through these steps, the peak amount 504 and the leakage amount 505 for each combination of the job type 501 and the function name 502 as shown in FIG. 5 are extracted. Through the processes of the analysis program 201 described above, the leak pattern 207 as shown in FIG. 5 is generated. In step S903, the CPU 101 may use a maximum value or minimum value instead of calculating the average values.

Calculation Program 202 and Input/Output Data Thereof

The calculation program 202 calculates functions that are actually executed by the semiconductor exposure apparatus 140 based on the jobs that the user is going to execute with the semiconductor exposure apparatus 140. First, the production plan 208 and the job definition information 209 that are input data will be described.

FIG. 10 is a diagram illustrating an exemplary production plan 208. The production plan 208 is information regarding jobs that are going to be input into the semiconductor exposure apparatus 140. In the production plan 208, a record is created for each job that is going to be input. The production plan 208 may be generated by the user who inputs the jobs, or an application of the semiconductor exposure apparatus 140 may automatically generate the production plan 208. Alternatively, the production plan 208 may be input directly into the support apparatus 100, or the production plan 208 that has been inputted into the semiconductor exposure apparatus 140 may be acquired by the support apparatus 100.

The production plan 208 includes input order 1001, job type 1002 and recipe ID 1003. The input order 1001 is the order in which jobs that are going to be input into the semiconductor exposure apparatus are input. The job type 1002 is the type of jobs that are going to be input into the semiconductor exposure apparatus. The recipe ID 1003 is an identifier that identifies the recipe of an input job. "Recipe" means the settings of the semiconductor exposure apparatus for executing a job, and is defined in detail in the job definition information 209.

FIGS. 11A and 11B are diagrams illustrating exemplary job definition information 209. The job definition information 209 is information regarding setting details for each job. In the job definition information 209, a record is defined for each setting detail. The job definition information 209 is managed by the semiconductor exposure apparatus 140, and the support apparatus 100 can acquire the job definition information 209 from the semiconductor exposure apparatus 140.

FIG. 11A is a diagram illustrating an example of recipe information 1100. The recipe information 1100 includes recipe ID 1101 and setting name 1102. The recipe ID 1101 is an identifier that identifies the type of recipe. The setting name 1102 is the name of a setting of the semiconductor exposure apparatus 140, and examples include "Exposure Illumination Mode", "Reticle Data", "Layout" and so on. The setting details of the setting name 1102 are prescribed in another table.

FIG. 11B is a diagram illustrating an example of reticle data settings 1110. In the reticle data settings 1110, "Reticle Data" parameters are prescribed. Reticle data 1111 is an identifier that identifies the type of "Reticle Data". Parameter settings 1112 are set values for the parameters used in the "Reticle Data".

Although not discussed in further detail, for other settings such as "Exposure Illumination Mode" and "Layout", a table similar to that of the reticle data settings 1110 is defined. With such a table, parameter settings when executing a job written in the job type 1002 can be acquired using the recipe ID 1003 as a key.

Next, the function execution plan 210 that is output data will be described with reference to FIGS. 12A and 12B. The function execution plan 210 is information that prescribes the functions that are actually executed by the semiconductor exposure apparatus 140 and the order of the functions. FIGS. 12A and 12B are diagrams illustrating an exemplary function execution plan 210. In the function execution plan 210, a record is created for each function of an input job. Input order 1201 is the order of jobs input into the semiconductor exposure apparatus 140. Job type 1202 is the type of an input job. Function name 1203 is the name of a function executed in each job. Execution order 1204 is the order in which the functions are to be executed. Parameter settings 1205 are set values for the parameters used to execute each job. The semiconductor exposure apparatus 140 executes the functions listed under the function name 1203 in the order specified by the input order 1201 and the execution order 1204 using the settings specified by the parameter settings 1205.

Figure 13:
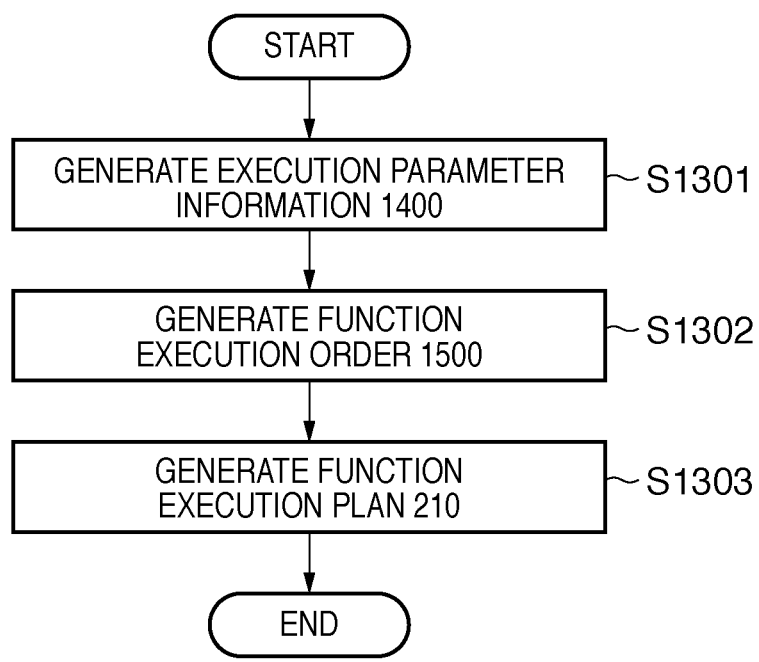
FIG. 13 is a flowchart illustrating an exemplary operation performed by a calculation program 202 according to an embodiment of the present invention.

Next, an operation performed by the calculation program 202 will be described with reference to FIG. 13. FIG. 13 is a flowchart illustrating an example of an operation of the calculation program 202 according to the present embodiment. This operation is executed by the CPU 101 processing the calculation program 202.

In step S1301, the CPU 101 generates execution parameter information 1400 shown in FIG. 14 based on the production plan 208 and the function execution plan 210. FIG. 14 is a diagram illustrating exemplary execution parameter information 1400. The execution parameter information 1400 is information that associates a job that is going to be input with set parameter values specified in the job. Input order 1401 and job type 1402 correspond to the input order 1001 and the job type 1002 of the production plan 208 shown in FIG. 10, respectively. Parameter settings 1403 are set values for the parameters of each job extracted using the recipe ID 1003 of the production plan 208 as a key. Also, a job that is necessary for adjustment or maintenance of an exposure process such as "Calibration" may be automatically inserted even when the job is not written in the production plan 208.

Reverting to FIG. 13, in step S1302, the CPU 101 generates a function execution order 1500 shown in FIG. 15 based on the execution parameter information 1400. FIG. 15 is a diagram illustrating an exemplary function execution order 1500. The function execution order 1500 is information that prescribes the functions that are going to be executed in each job that is going to be input and the order of the functions. Input order 1501 and job type 1502 correspond to the input order 1001 and the job type 1002 of the production plan 208 shown in FIG. 10, respectively. Execution function 1503 shows the functions executed in each job and the order of the functions, which are determined by set parameters.

Reverting to FIG. 13, in step S1303, the CPU 101 generates a function execution plan 210 based on the function execution order 1500.

Determination Program 203 and Input/Output Data Thereof

The determination program 203 is a program that determines whether or not the memory of the semiconductor exposure apparatus 140 will be exhausted when a job that is going to be executed is executed. Among the leak pattern 207, the function execution plan 210 and the allowable memory usage 211 that are inputted data, undescribed allowable memory usage 211 will be described. The allowable memory usage 211 is the memory capacity that can be used by the semiconductor exposure apparatus 140 to execute a job that is defined in the production plan 208 as a job to be executed. The allowable memory usage 211 may be, for example, a value obtained by subtracting the memory usage being used by the semiconductor exposure apparatus 140 before the execution of a job from the entire memory capacity of the semiconductor exposure apparatus 140. Furthermore, by subtracting a prescribed safety constant from the obtained value, or the like, a correction considering a design value may be performed.

The memory exhaustion information 212 that is output data is information regarding whether or not the allowable memory usage 211 will be used up when executing the job specified in the production plan 208, and if it is determined that the allowable memory usage 211 will be used up, a point in time and which function of which job in which it will be used up.

Figure 16:
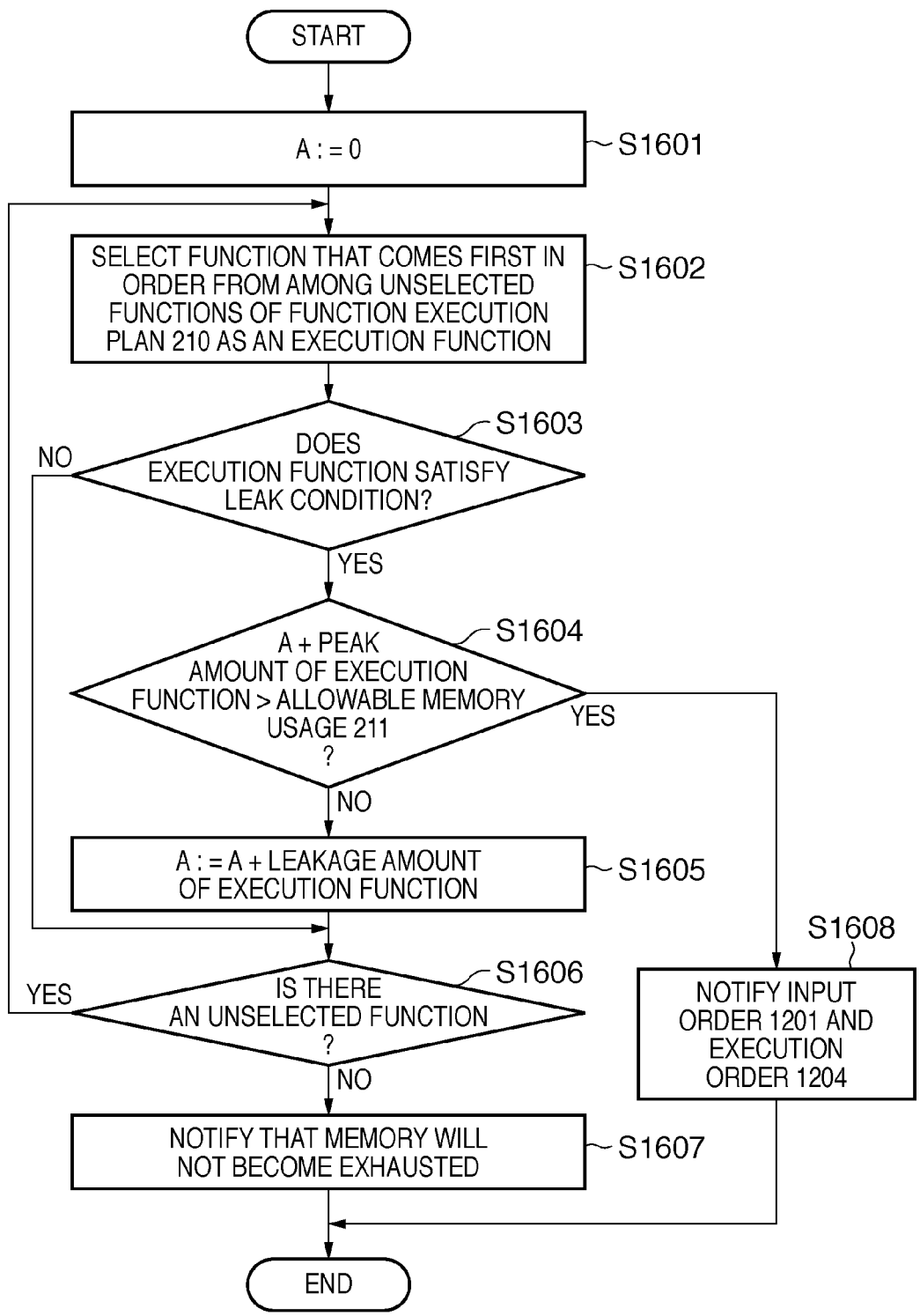
FIG. 16 is a flowchart illustrating an exemplary operation performed by a determination program 203 according to an embodiment of the present invention.

Next, an operation performed by the determination program 203 will be described with reference to FIG. 16. FIG. 16 is a flowchart illustrating an exemplary operation of the determination program 203. This operation is executed by the CPU 101 processing the determination program 203.

In step S1601, the CPU 101 initializes a variable A representing the total value of memory leakage amounts at each point in time to 0.

In step S1602, the CPU 101 selects a function that comes first in order from among unselected functions of the function execution plan 210 as an execution function. The function that comes first in order is determined based on the input order 1201 of the job and the execution order 1204 of the function.

In step S1603, the CPU 101 determines whether or not the selected execution function satisfies the leak conditions 503 of the leak pattern 207. If the selected execution function satisfies the leak conditions 503 ("YES" in step S1603), the procedure advances to step S1604. If the selected execution function does not satisfy the leak conditions 503 ("NO" in step S1603), the procedure advances to step S1606.

In step S1604, the CPU 101 determines whether or not the total of A, which is the total value of the amounts of leakage predicted to occur in a preceding function, and the peak amount 504 of the execution function exceed the allowable memory usage 211. If the total exceeds the allowable memory usage 211 ("YES" in step S1604), the procedure advances to step S1608. In this case, because the memory will be exhausted, in step S1608, the user of the support apparatus 100 is notified of the job input order 1201 and the function execution order 1204, and the process ends.

If the total does not exceed ("NO" in step S1604), the procedure advances to step S1605, where the CPU 101 adds the leakage amount 505 of the execution function to A.

In step S1606, the CPU 101 determines whether or not there is an unselected function in the function execution plan 210. If there is no unselected function ("NO" in step S1606), in step S1607, the CPU 101 notifies the user of the support apparatus 100 with a message that the memory will not become exhausted even when the job that is going to be executed is executed. If there is an unselected function ("YES" in step S1606), the procedure returns to step S1602.

Through these steps, it is possible to determine whether or not the memory of the semiconductor exposure apparatus 140 will be exhausted when executing a group of jobs that is going to be executed based on the history of jobs executed in the past. Furthermore, when it is determined that the memory will be exhausted, it is possible to determine which function of which job in which the memory will be exhausted, so the user can take an action such as restarting the semiconductor exposure apparatus 140 according to the obtained result.

In the present embodiment, although the confidence level of the leak conditions 503 is set to 1, in order to cope with the case where there is noise or a counter-example, a stochastic or statistical process may be included. Also, the present embodiment was described in the context in which the functions of a job are sequentially executed, but memory exhaustion information 212 may be calculated considering that some functions are executed in parallel. Furthermore, the support apparatus 100 may perform processes online in parallel and concurrently with the operation of the semiconductor exposure apparatus 140, or perform batch processing while the operation of the semiconductor exposure apparatus 140 is stopped.

<Second Embodiment>

In the first embodiment, a case in which a leak condition that causes a memory leak is determined from a combination of job type, function name and parameter setting values was discussed. In the present embodiment, a case in which the leak condition depends on the execution order of the functions of a job will be described. Descriptions that overlap with the first embodiment are omitted, and the characteristic features of the present embodiment will be mainly described.

FIGS. 17A and 17B are diagrams illustrating exemplary function leak information 1700 according to the present embodiment, from which it can be seen that there are cases in which a leak occurs and in which no leak occurs even when the same job, the same function and the same set parameter values are combined. Accordingly, by including preceding and succeeding functions and the position within the job as leak conditions, whether or not the memory will be exhausted can be determined with even higher accuracy.

Figure 18:
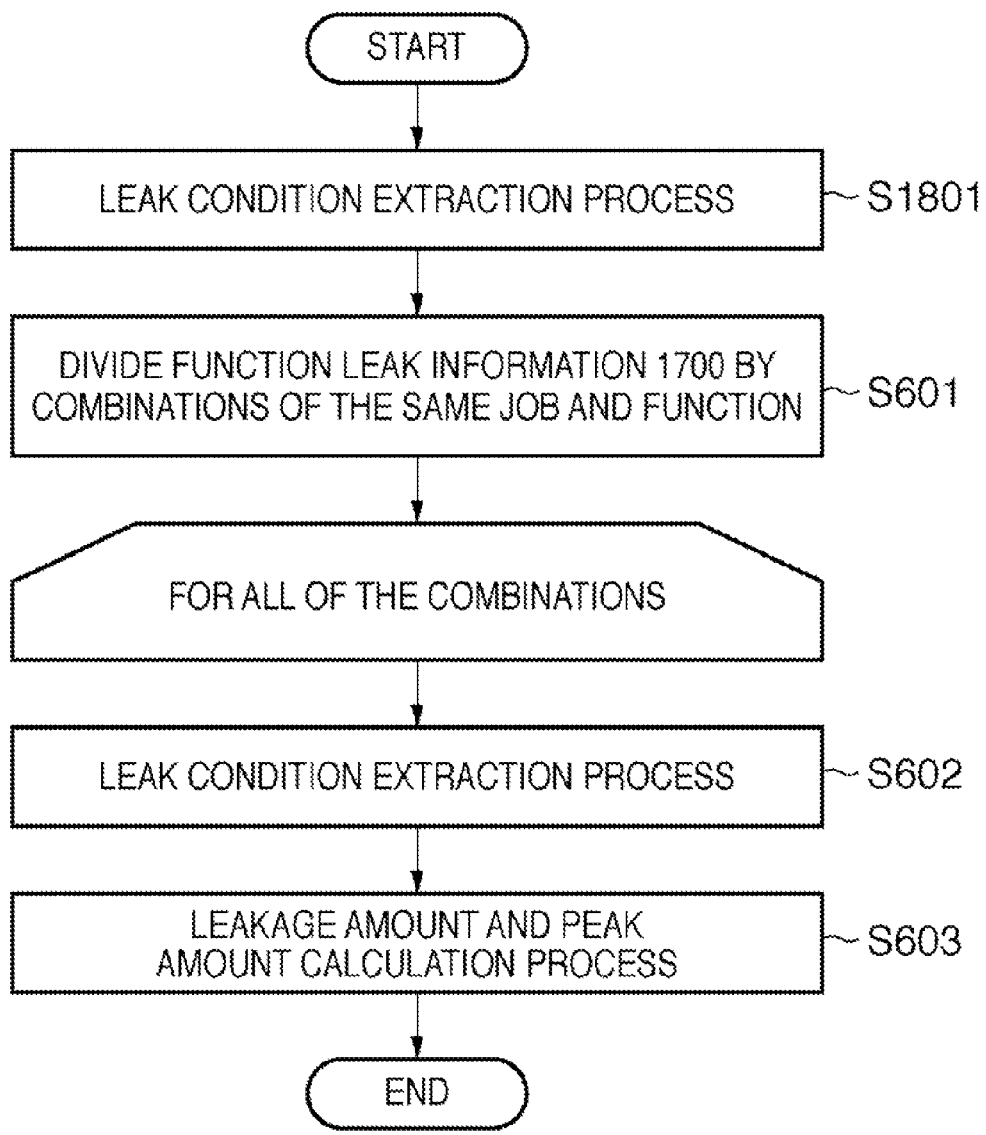
FIG. 18 is a flowchart illustrating an exemplary operation performed by an analysis program 201 according to the second embodiment of the present invention.

FIG. 18 is a flowchart illustrating an exemplary operation of the analysis program 201 of the present embodiment. This operation is executed by the CPU 101 processing the analysis program 201. A difference from FIG. 6 is that the CPU 101 extracts control information 1701 in step S1801. The control information 1701 is information regarding a difference in the repetition of a function in a job, and the position in which the function appears in the job.

Figure 19:
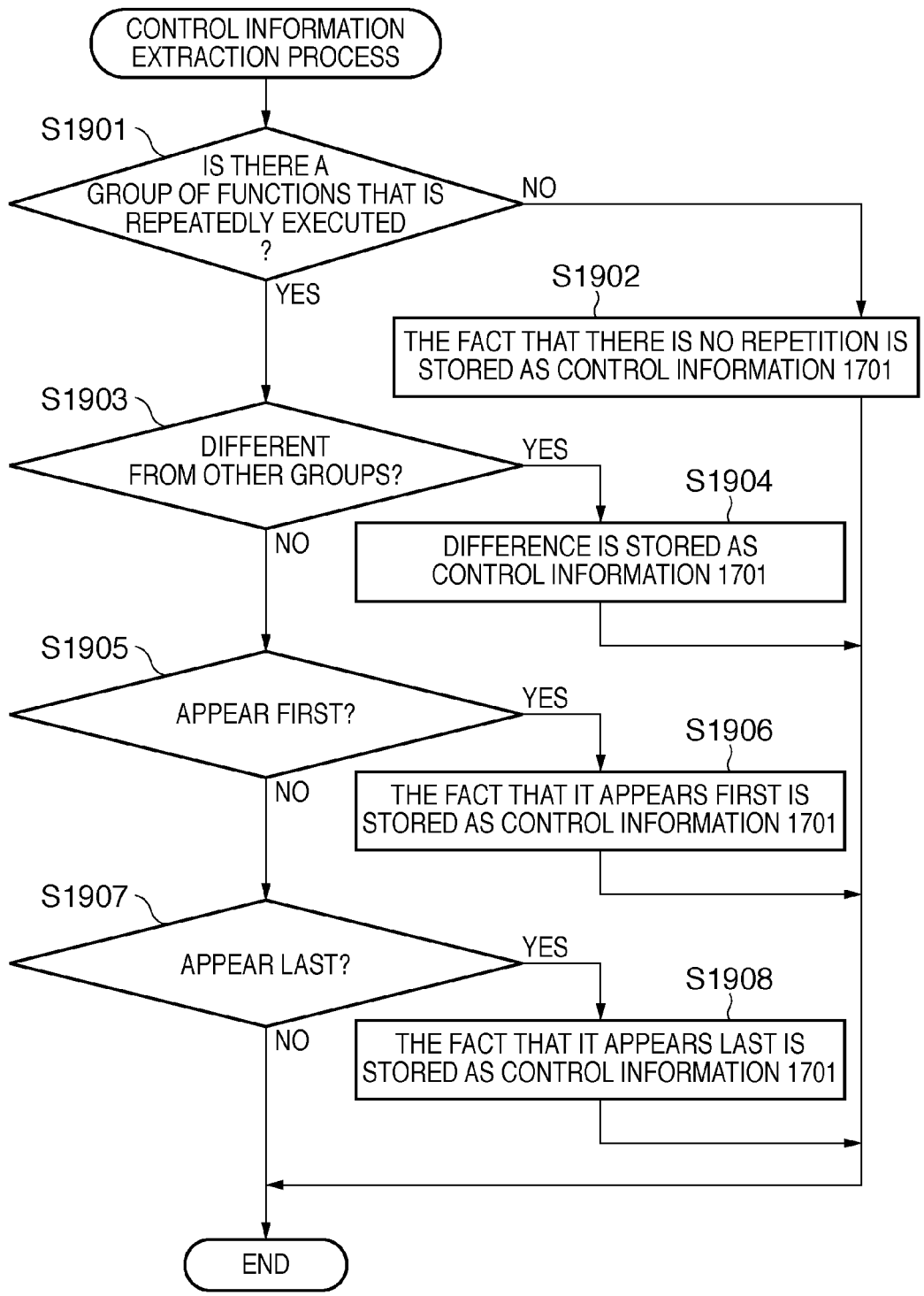
FIG. 19 is a flowchart illustrating an exemplary operation for extracting control information according to the second embodiment of the present invention.
Figure 21A:
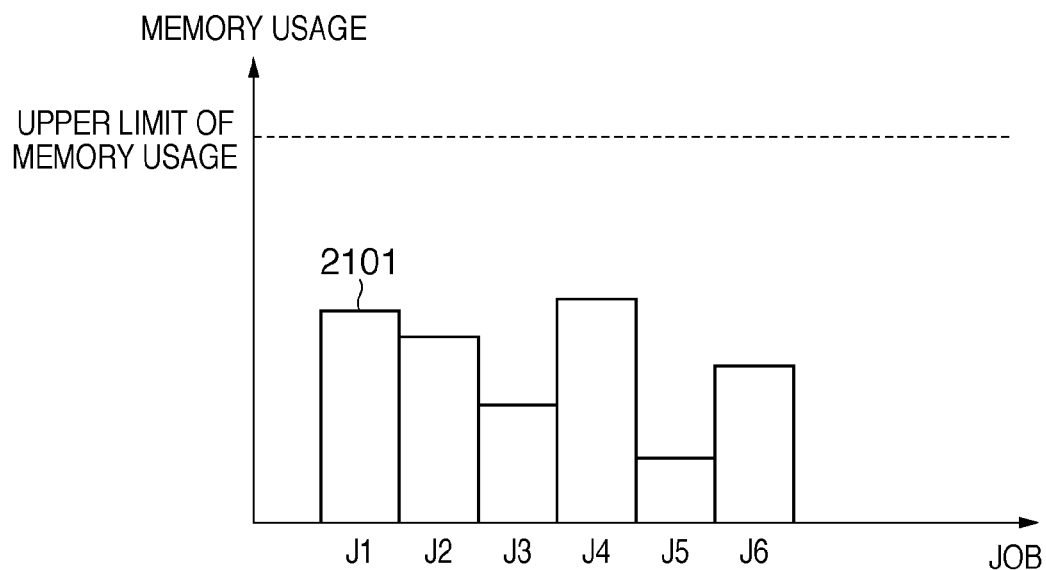
FIG. 21A is a diagram used to illustrate memory usage status when a job that causes a leak is not present in an information processing apparatus.
Figure 21B:
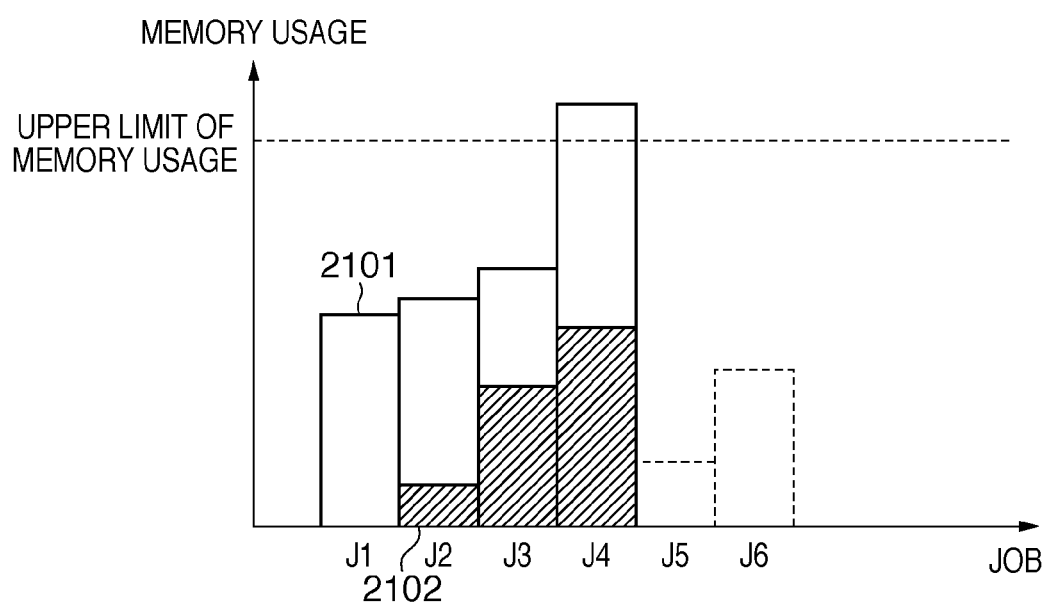
FIG. 21B is a diagram used to illustrate memory usage status when a job that causes a leak is present in the information processing apparatus.

Step S1801 of FIG. 18 will be described in further detail with reference to FIG. 19. FIG. 19 is a flowchart illustrating an exemplary operation of a process for extracting control information. This operation is executed by the CPU 101 processing the analysis program 201.

In step S1901, the CPU 101 determines whether or not there is a group of functions that is repeatedly executed in each job. For example, in FIGS. 17A and 17B, a group of functions "Transfer", "Measurement 1", "Measurement 2" and "Exposure" appears repeatedly in the job whose job ID 401 is "00020". Meanwhile, in the job whose job ID 401 is "00030", there is no repetition. In this case ("NO" in step S1901), the procedure advances to step S1902, where the CPU 101 stores the fact that there is no repetition as control information 1701. For example, a record 1704 corresponds to this.

If there is a repetition ("YES" in step S1901), the procedure advances to step S1903, where the CPU 101 determines whether or not the repetition is different from other repetitions. For example, referring to the job whose job ID 401 is "00010" in FIGS. 17A and 17B, a group of functions whose execution order 404 are "9" to "12" includes "Measurement 3", which is different from other repetitions. If there is a difference ("YES" in step S1903), the procedure advances to step S1904, where the difference is stored as control information 1701. For example, records 1702 correspond to this.

If there is no difference ("NO" in step S1903), the procedure advances to step S1905, where the CPU 101 determines whether or not the repetition is a repetition that appears first in the job. If it is a repetition that appears first ("YES" in step S1905), the procedure advances to step S1906, where the fact that it is a repetition that appears first is stored as control information 1701. For example, a record 1705 corresponds to this. Extraction of such control information 1701 is effective when there is a function that causes a leak only when it appears first.

If it is not a repetition that appears first ("NO" in step S1905), the procedure advances to step S1907, where the CPU 101 determines whether or not the repetition is a repetition that appears last in the job. If it is a repetition that appears last ("YES" in step S1907), the procedure advances to step S1908, where the fact that it is a repetition that appears last is stored as control information 1701. For example, a record 1703 corresponds to this. Extraction of such control information 1701 is effective when there is a function that causes a leak only when it appears last. If it is not a repetition that appears last ("NO" in step S1907), the procedure ends.

FIG. 20 is a diagram illustrating an exemplary leak pattern 2000 of the present embodiment. It can be seen that the control information 1701 is reflected in leak condition 2001. Although not discussed in detail, the control information 1701 is also reflected in the function execution plan 210.

As described above, by including preceding and succeeding functions and the position within the job as leak conditions, whether or not the memory will be exhausted can be determined with even higher accuracy. The present embodiment was described in the context of the control information including whether or not there is a repetition, whether or not there is a difference from other repetitions, and whether the repetition appears first or last, but it is also possible to add items based on other guidelines. It is also possible to change the extraction order of the control information.

<Other Embodiments>

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-238385, filed on Sep. 17, 2008, which is hereby incorporated by reference herein in its entirety.

What is claimed is:

1. A support apparatus that supports an information processing apparatus that executes a plurality of jobs, the support apparatus comprising:
   a storage unit configured to store (i) a plurality of memory leak amounts corresponding respectively to the plurality of executed jobs and (ii) a plurality of peak memory usage amounts corresponding respectively to the plurality of executed jobs;
   an acquisition unit configured to, before executing a first job, (a) acquire a total memory leakage of the information processing apparatus based on at least one of the plurality of memory leak amounts corresponding to the plurality of executed jobs and (b) acquire a peak memory usage amount based on at least one of the plurality of peak memory usage amounts, wherein the at least one of the plurality of peak memory usage amounts is selected for the acquisition based on comparison of a parameter setting of the first job and a parameter setting of each of the plurality of executed jobs; and
   a determination unit configured to determine, before executing the first job, whether or not an increasing memory usage that would be caused by executing the first job exceeds a memory capacity of the information processing apparatus that is allowed, based on the peak memory usage amount and the total memory leakage acquired by said acquisition unit,
   wherein, based on the determination by the determination unit, (a) not executing the first job if the increasing memory usage exceeds the memory capacity of the information processing apparatus, and (b) executing the first job if the increasing memory usage does not exceed the memory capacity of the information processing apparatus, and
   wherein said acquisition unit (a) acquires the peak memory usage amount corresponding to the first job based on average values of the peak memory usage amounts corresponding to jobs similar to the first job stored by said storage unit, or (b) acquires the peak memory usage amount based on the maximum value of the at least one of the plurality of peak memory usage amounts corresponding to the jobs similar to the first job stored by the said storage unit, and
   wherein the support apparatus includes a processor.

2. The support apparatus according to claim 1, wherein, when it is determined that the increasing memory usage that would be caused by executing the first job exceeds the memory capacity that is allowed, said determination unit notifies a user of the support apparatus of the first job.

3. The support apparatus according to claim 1, wherein said acquisition unit acquires the total memory leakage of the information processing apparatus based on at least one of the plurality of memory leak amounts corresponding to the plurality of executed jobs and execution order of the plurality of executed jobs.

4. The support apparatus according to claim 1, wherein each of the plurality of jobs is at least one of exposure sequence, measurement or calibration.

5. A support method for supporting an information processing apparatus that executes a plurality of jobs, the method being performed by a computer device, the method comprising:
   storing (i) a plurality of memory leak amounts corresponding respectively to the plurality of executed jobs and (ii) a plurality of peak memory usage amounts corresponding respectively to the plurality of executed jobs in a storage unit;
   before executing a first job, (a) acquiring a total memory leakage of the information processing apparatus based on at least one of the plurality of memory leak amounts corresponding to the plurality of executed jobs and (b) acquiring a peak memory usage amount based on at least one of the plurality of peak memory usage amounts, wherein the at least one of the plurality of peak memory usage amounts is selected for the acquisition based on comparison of a parameter setting of the first job and a parameter setting of each of the plurality of executed jobs; and
   determining, by a determination unit before executing the first job, whether or not an increasing memory usage that would be caused by executing the first job exceeds a memory capacity of the information processing apparatus that is allowed, based on the peak memory usage amount and the total memory leakage acquired in the acquiring step,
   wherein, based on the determining step, (a) not executing the first job if the increasing memory usage exceeds the memory capacity of the information processing apparatus, and (b) executing the first job if the increasing memory usage does not exceed the memory capacity of the information processing apparatus, and
   wherein (a) the peak memory usage amount corresponding to the first job is acquired based on average values of the peak memory usage amounts corresponding to jobs similar to the first job stored by the storage unit, or (b) the peak memory usage amount is acquired based on the maximum value of the at least one of the plurality of peak memory usage amounts corresponding to the jobs similar to the first job stored by the said storage unit.

6. A non-transitory computer-readable storage medium storing an executable program for causing a computer to execute a support method for supporting an information processing apparatus that executes a plurality of jobs, the method comprising:
   storing (i) a plurality of memory leak amounts corresponding respectively to the plurality of executed jobs and (ii) a plurality of peak memory usage amounts corresponding respectively to the plurality of executed jobs in a storage unit;
   before executing a first job, (a) acquiring a total memory leakage of the information processing apparatus based on at least one of the plurality of memory leak amounts corresponding to the plurality of executed jobs and (b) acquiring a peak memory usage amount based on at least one of the plurality of peak memory usage amounts, wherein the at least one of the plurality of peak memory usage amounts is selected for the acquisition based on comparison of a parameter setting of the first job and a parameter setting of each of the plurality of executed jobs; and
   determining, by a determination unit before executing the first job, whether or not an increasing memory usage that would be caused by executing the first job exceeds a memory capacity of the information processing apparatus that is allowed, based on the peak memory usage amount and the total memory leakage acquired in the acquiring step, wherein, based on the determining step, (a) not executing the first job if the increasing memory usage exceeds the memory capacity of the information processing apparatus, and (b) executing the first job if the increasing memory usage does not exceed the memory capacity of the information processing apparatus, and wherein (a) the peak memory usage amount corresponding to the first job is acquired based on average values of the peak memory usage amounts corresponding to jobs similar to the first job stored by the storage unit, or (b) the peak memory usage amount is acquired based on the maximum value of the at least one of the plurality of peak memory usage amounts corresponding to the jobs similar to the first job stored by the said storage unit.

7. A device comprising:

means for storing, for each of a plurality of executed jobs that were executed by an information processing apparatus, (i) a memory leak amount corresponding to the executed job, (ii) a peak memory use amount corresponding to the executed job, and (iii) a parameter setting of the executed job that was used when the executed job was executed by the information processing apparatus; and means for, before executing a new job, (a) comparing a parameter setting of the new job to the parameter setting of the executed jobs, (b) in accordance with the comparison, (1) acquiring a peak memory use amount based on an average value or the maximum value of the stored peak memory use amounts corresponding executed jobs similar to the new job, and (2) acquiring a memory leak amount in accordance with the stored memory leak amounts corresponding to at least one of the executed jobs, and (c) determining, in accordance with (1) the acquired peak memory use amount, (2) the acquired memory leak amount, and (3) a memory capacity of the information processing apparatus, whether or not an increasing memory usage that would be caused by executing the new job exceeds a memory capacity of the information processing apparatus that is allowed and whether or not to execute the new job, wherein the device includes a processor.

8. A device comprising:

means for storing, for each of a plurality of executed jobs that were executed by an information processing apparatus, (i) a memory leak amount corresponding to the executed job, (ii) a peak memory use amount corresponding to the executed job, and (iii) a parameter setting of the executed job that was used when the executed job was executed by the information processing apparatus; and means for, before executing a new job, (a) comparing a parameter setting of the new job to the parameter setting of each of the plurality of executed jobs, (b) in accordance with the comparison, (1) selecting a plurality of the executed jobs similar to the new job, (2) acquiring a peak memory use amount based on an average value or the maximum value of the stored peak memory use amounts corresponding to the selected executed jobs, and (3) acquiring a memory leak amount in accordance with an average of memory leak amounts respectively corresponding to the selected executed jobs, and (c) determining, in accordance with (1) the acquired peak memory use amount, (2) the acquired memory leak amount, and (3) a memory capacity of the information processing apparatus, whether or not an increasing memory usage that would be caused by executing the new job exceeds a memory capacity of the information processing apparatus that is allowed and whether or not to execute the new job, wherein the device includes a processor.

9. A device comprising:

means for storing, for each of a plurality of executed jobs that were executed by an information processing apparatus, (i) a memory leak amount corresponding to the executed job, (ii) a peak memory use amount corresponding to the executed job, and (iii) a parameter setting of the executed job that was used when the executed job was executed by the information processing apparatus; and means for, before executing a new job, (a) comparing a parameter setting of the new job to the parameter setting of each of the plurality of executed jobs, (b) in accordance with the comparison, (1) selecting a plurality of the executed jobs similar to the new job, (2) acquiring a peak memory use amount based on an average value or the maximum value of the stored peak memory use amounts corresponding to the selected executed jobs, and (3) acquiring a memory leak amount in accordance with a maximum of memory leak amounts respectively corresponding to the selected executed jobs, and (c) determining, in accordance with (1) the acquired peak memory use amount, (2) the acquired memory leak amount, and (3) a memory capacity of the information processing apparatus, whether or not an increasing memory usage that would be caused by executing the new job exceeds a memory capacity of the information processing apparatus that is allowed and whether or not to execute the new job, wherein the device includes a processor.

\* \* \* \* \*